United States Patent
Kumar et al.

(10) Patent No.: US 11,963,091 B2
(45) Date of Patent: Apr. 16, 2024

(54) METHOD AND SYSTEM FOR HANDLING PAGING IN WIRELESS COMMUNICATION SYSTEM

(71) Applicant: Samsung Electronics Co., Ltd., Suwon-si (KR)

(72) Inventors: Lalith Kumar, Bangalore (IN); Alok Kumar Jangid, Bangalore (IN); Kailash Kumar Jha, Bangalore (IN); Danish Ehsan Hashmi, Bangalore (IN); Govind Irappa Uttur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/558,351

(22) Filed: Dec. 21, 2021

(65) Prior Publication Data

US 2022/0132406 A1    Apr. 28, 2022

Related U.S. Application Data

(63) Continuation of application No. 16/627,015, filed as application No. PCT/KR2018/009097 on Aug. 9, 2018, now Pat. No. 11,206,606.

(30) Foreign Application Priority Data

Aug. 9, 2017 (IN) .............................. 201741028350
Aug. 7, 2018 (IN) .............................. 201741028350

(51) Int. Cl.
*H04W 48/16* (2009.01)
*H04W 8/08* (2009.01)
(Continued)

(52) U.S. Cl.
CPC ............ *H04W 48/16* (2013.01); *H04W 8/08* (2013.01); *H04W 36/0033* (2013.01);
(Continued)

(58) Field of Classification Search
CPC ............ H04W 58/12; H04W 36/0033; H04W 36/0022; H04W 48/02; H04W 12/08;
(Continued)

(56) References Cited

U.S. PATENT DOCUMENTS 8,873,510 B2    10/2014    Yuan et al.
8,983,463 B2    3/2015    Yoshimura et al.
(Continued)

FOREIGN PATENT DOCUMENTS

CN    101203028 A    6/2008
CN    101325583 A    12/2008
(Continued)

OTHER PUBLICATIONS

Full Translation of WO 2018/008944, Feb. 2023 (Year: 2023).*
(Continued)

*Primary Examiner* — William D Cumming

(57) ABSTRACT

Embodiments herein achieve a method for handling registration and session management in a wireless communication system. The method includes registering, by a User Equipment (UE), with a first core network entity over a 3GPP access network and a non-3GPP access network. Further, the method includes triggering, by the UE, a registration procedure to a second core network over the 3GPP access network when a periodic timer of the UE expires in an OOS state. Further, the method includes receiving, by the UE, a non-access stratum (NAS) message, over the 3GPP access network, with an indication to register for the non-3GPP access network with the second core network entity. Further, the method includes reinitiating the registration (Continued)

procedure to register again for the non-3GPP access with the second core network entity through the non-3GPP access network.

10 Claims, 37 Drawing Sheets

(51) Int. Cl.
| | | |
|---|---|---|
| *H04W 36/00* | (2009.01) | |
| *H04W 60/04* | (2009.01) | |
| *H04W 60/06* | (2009.01) | |
| *H04W 76/11* | (2018.01) | |
| *H04W 76/25* | (2018.01) | |
| *H04W 84/04* | (2009.01) | |
| *H04W 88/06* | (2009.01) | |

(52) U.S. Cl.
CPC ........... *H04W 60/04* (2013.01); *H04W 60/06* (2013.01); *H04W 76/11* (2018.02); *H04W 76/25* (2018.02); *H04W 88/06* (2013.01); *H04W 84/042* (2013.01)

(58) Field of Classification Search
CPC . H04W 76/10; H04W 28/0231; H04W 28/02; H04W 48/16; H04W 26/023; H04W 26/02; H04W 60/04; H04W 68/005
USPC .................................................. 370/331, 356
See application file for complete search history.

(56) References Cited

U.S. PATENT DOCUMENTS

| | | | |
|---|---|---|---|
| 9,414,298 B1 | 8/2016 | Pasupuleti et al. | |
| 10,251,108 B2 | 4/2019 | Jung et al. | |
| 10,893,413 B2 | 1/2021 | Niemi et al. | |
| 2008/0259912 A1* | 10/2008 | Wang .................... | H04W 68/12 |
| | | | 370/356 |
| 2012/0087345 A1 | 4/2012 | Yan et al. | |
| 2012/0179789 A1 | 7/2012 | Griot et al. | |
| 2012/0269167 A1 | 10/2012 | Velev et al. | |
| 2012/0307797 A1 | 12/2012 | Yuan et al. | |
| 2014/0036873 A1* | 2/2014 | Cheng ............... | H04W 36/0033 |
| | | | 370/331 |
| 2015/0004966 A1 | 1/2015 | Ayleni et al. | |
| 2015/0009824 A1 | 1/2015 | Jeong et al. | |
| 2015/0172981 A1 | 6/2015 | Janakiraman | |
| 2016/0119896 A1 | 4/2016 | Jujaray et al. | |
| 2016/0135247 A1 | 5/2016 | Ozturk et al. | |
| 2016/0373973 A1 | 12/2016 | Rommer et al. | |
| 2017/0201939 A1* | 7/2017 | Lee ....................... | H04W 48/16 |
| 2017/0374552 A1* | 12/2017 | Xia ....................... | H04W 12/08 |
| 2020/0107256 A1 | 4/2020 | Nilsson et al. | |
| 2020/0107401 A1 | 4/2020 | Kumar et al. | |
| 2020/0120585 A1 | 4/2020 | Kumar et al. | |
| 2020/0128402 A1 | 4/2020 | Niemi et al. | |
| 2020/0305118 A1* | 9/2020 | Ryu ....................... | H04W 76/16 |
| 2021/0092598 A1 | 3/2021 | Niemi et al. | |

FOREIGN PATENT DOCUMENTS

| | | | | |
|---|---|---|---|---|
| CN | 103416083 A | 11/2013 | | |
| EP | 3691356 A1 | 8/2020 | | |
| EP | 3713370 A1 * | 9/2020 | .......... | H04W 68/005 |
| JP | 2017017451 A | 1/2017 | | |
| KR | 10-2013-0133600 A1 | 12/2013 | | |
| KR | 10-1409031 B1 | 6/2014 | | |
| KR | 20140119607 A | 10/2014 | | |
| KR | 10-2017-0059987 A1 | 5/2017 | | |
| WO | 2004004187 A2 | 1/2004 | | |
| WO | WO-2012147270 A1 * | 11/2012 | ........ | H04W 36/0022 |
| WO | WO-2016018012 A1 * | 2/2016 | ........ | H04W 28/0231 |
| WO | 2016043559 A1 | 3/2016 | | |
| WO | WO-2016114611 A1 * | 7/2016 | ........... | H04W 28/14 |
| WO | WO-2018008944 A1 * | 1/2018 | ........... | H04W 60/04 |
| WO | WO-2018070689 A1 * | 4/2018 | ........... | H04W 28/02 |
| WO | WO-2018097601 A1 * | 5/2018 | ........... | H04W 60/06 |
| WO | 2019098496 A1 | 5/2019 | | |
| WO | WO-2020254968 A1 * | 12/2020 | | |

OTHER PUBLICATIONS

Pertinent Translation of WO 2018/008944, Feb. 2023 (Year: 2023).*
Full Translation of WO-2018070689 Feb. 2023 (Year: 2023).*
Nicole Singh, "What is the 5G Access and Mobility Management Function (AMF)?" Jan. 2023 (Year: 2023).*
CATT, "TS 23.501: Discussion on single registration without Nx interface", SA WG2 Meeting #121, May 15-19, 2017, SA-173222, 4 pages.
European Search Report dated Jun. 28, 2022 in connection with European Patent Application No. 22 16 2118.8, 13 pages.
ISA/KR, International Search Report and Written Opinion of the International Searching Authority, International Application No. PCT/KR2018/009097, dated Nov. 13, 2018, 8 pages.
3GPP TS 33.501 V0.2.0 (May 2017), Technical Specification, 3rd Generation Partnership Project; Technical Specification Group Services and System Aspects; Security Architecture and Procedures for 5G System (Release 15), May 2017, 25 pages.
3GPP TS 23.501 V0.3.1 (Mar. 2017), Technical Specification, 3rd Generation Partnership Project; Technical Specification Group Services and System Aspects; System Architecture for the 5G System; Stage 2 (Release 15), Mar. 2017, 97 pages.
LG Electronics, "Interworking options for supporting or non-supporting NGx", SA WG2 Meeting #118-BIS, Jan. 16-20, 2017, S2-17203, 3 pages.
Qualcomm Incorporated, "Mobility inside 5GC and between 5GC and EPC for interworking scenarios", SA WG2 Meeting #S2-119, Feb. 13-17, 2017, S2-170743, 6 pages.
Intel, "23.501: Way forward for NGC-EPC Interworking: General", 3GPP TSG SA WG2 Meeting #119, Feb. 13-17, 2017, S2-170918, 3 pages.
NTT Docomo, "TS 23.502: Registration procedure changes for EPS to NGS idle mode mobility with Nx interface", SA WG2 Meeting #120, May 15-19, 2017, S2-173318, 6 pages.
NTT Docomo, "23.501: Dual Registration Mobility", SA WG2 Meeting #121, May 15-19, 2017, S2-173319, 10 pages.
NTT Docomo, "No-Nx Interworking Procedures", SA WG2 Meeting #122, Jun. 26-30, 2017, S2-175156, 12 pages.
Supplementary European Search Report dated Jun. 17, 2020 in connection with European Patent Application No. 18 84 3728, 13 pages.
Office Action dated Apr. 26, 2021 in connection with Chinese Patent Application No. 201880039263.X, 20 pages.
Office Action dated Nov. 12, 2020 in connection with India Patent Application No. 201741028350, 5 pages.
Yusof, et al., "A new proposed location registration procedure in next-generation mobile networks (NGMN)," 2011 IEEE International Conference on System Engineering and Technology, 2011, pp. 79-84, doi: 10.1109/ICEngT.2011.5993425, Aug. 2011.
Kunz, et al., "5G Evolution of Cellular IoT for V2X," 2018 IEEE Conference on Standards for Communications and Networking (CSCN), Dec. 2018, 22 pages.
Communication under Rule 71(3) EPC dated Feb. 28, 2023, in connection with European Application No. 22162118.8, 94 pages.
Office Action dated Feb. 22, 2023, in connection with Korean Application No. 10-2020-7001234, 9 pages.
Communication under Rule 71(3) EPC dated May 19, 2023, in connection with European Application No. 22162118.8, 94 pages.
European Search Report dated Jun. 6, 2023, in connection with European Application No. 23165462.5, 12 pages.
3GPP TS 23.501 V1.2.0 (Jul. 2017), Technical Specification, 3rd Generation Partnership Project; Technical Specification Group Services and System Aspects; System Architecture for the 5G System; Stage 2 (Release 15), Jul. 2017, 166 pages.

(56) References Cited

OTHER PUBLICATIONS

Nortel Networks, "Pseudo-CR on Paging for signalling received over S101," C1-08wxyz, 3GPP TSG CT WG1 Meeting #56, Shanghai, P.R. China, Nov. 10-14, 2008, 2 pages.
Office Action issued Feb. 7, 2024, in connection with Chinese Patent Application No. 202111183122.5, 30 pages.
Qualcomm Incorporated "TS 23.502: Support of PDU sessions over non-3GPP access for Ues in CM-IDLE state over non-3GPP access," S2-173131, SA WG2 Meeting #121, May 2017, Hangzou, China, 18 pages.
NTT Docomo, "P-CR for Single Registration-based lidle-mode mobility from EPS to 5GS procedure," S2-173318, SA WG2 Meeting #120, May 2017, Hangzou, China, 7 pages.

* cited by examiner

METHOD AND SYSTEM FOR HANDLING PAGING IN WIRELESS COMMUNICATION SYSTEM

CROSS-REFERENCE TO RELATED APPLICATIONS

This application is a continuation of application Ser. No. 16/627,015, now U.S. Pat. No. 11,206,606, which is a 371 National Stage of International Application No. PCT/KR2018/009097, filed Aug. 9, 2018, which claims priority to Indian Patent Application No. 201741028350, filed Aug. 9, 2017, and Indian Patent Application No. 201741028350, filed Aug. 7, 2018, the disclosures of which are herein incorporated by reference in their entirety.

BACKGROUND

1. Field

The present application relates to a wireless communication system, and more specifically related to method and system for handling registration and session management of non-3GPP access in the wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In a scenario in which a user equipment (UE) is registered to same network through a 3GPP access as well as a non-3GPP access and a periodic timer of the UE expires in Out Of service state (OOS) (in 3GPP access), various mechanisms for non 3GPP access handling in the 5G network are not available in the existing methods and systems. Thus, it is desired to address the above mentioned disadvantages or other shortcomings or at least provide a useful alternative.

The present application provides a method for handling registration and session management in a wireless communication system. The method includes registering, by a User Equipment (UE), with a first core network entity over a 3GPP access network and a non-3GPP access network. Further, the method includes triggering, by the UE, a registration procedure to a second core network over the 3GPP access network when a periodic timer of the UE expires in an OOS state.

The principal object of the embodiments herein is to provide a method and system for handling registration and session management of non-3GPP access in a wireless communication system.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
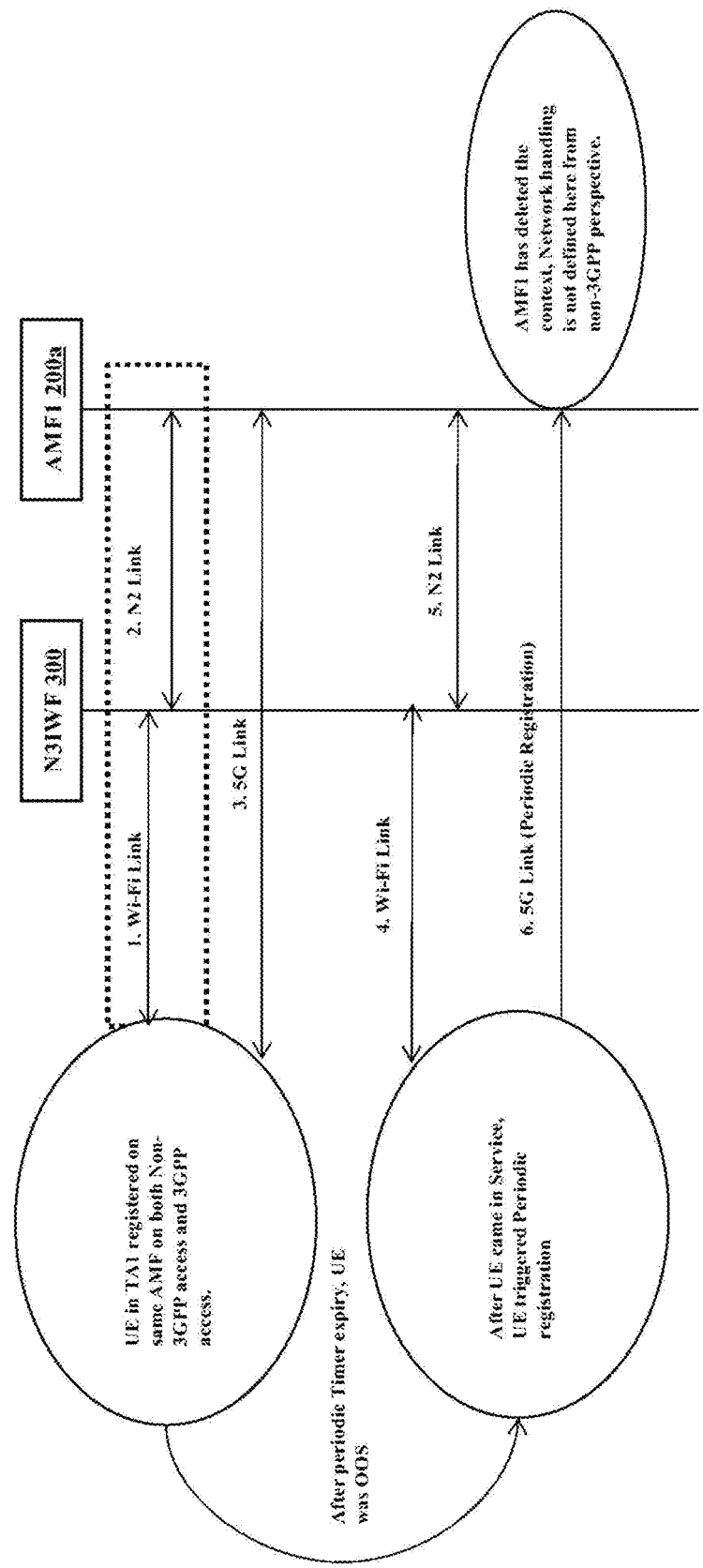
FIG. 1 illustrates a scenario in which an Access Management Function (AMF) has deleted a context of a UE 100 for 3GPP access.

Embodiments herein disclose a method for handling registration and session management in a wireless communication system. The method includes registering, by a User Equipment (UE), to first core network entity over a 3GPP access network and a non-3GPP access network. Further, the method includes triggering, by the UE, a registration procedure to a second core network entity over the 3GPP access network when a periodic timer of the UE expires in an OOS state. Further, the method includes receiving, by the UE, a NAS message (for example registration accept or registration reject message or detach message) over the 3GPP access network with an indication to register for the non-3GPP access network with the second core network entity. Further, the method includes reinitiating the registration procedure to register again for the non-3GPP access with the second core network entity through the non-3GPP access.

In an embodiment, the first core network entity decides to send the indication when it receives a request from UE with an indication to fetch the context from two different core network nodes and context transfer from one of the core network nodes fails.

In an embodiment, the registration procedure over non-3GPP access is reinitiated upon expiration of a retry timer and is reinitiated to create an N2 interface between a N3IWF and the second AMF entity.

In an embodiment, the first core network entity comprises one of a Mobility Management Entity (MME) in a fourth generation (4G) network or an Access Management Function (AMF) in a fifth generation (5G) network.

In an embodiment, the second core network entity indicates to register for the non-3GPP access network by the UE when a non-3GPP access context transfer from the first core network entity to the second core network entity is not successful.

Embodiments herein disclose a method for handling registration and session management in a wireless communication system. The method includes receiving, by a second AMF entity, registration procedure from a UE over a 3GPP access network. The UE is registered to the 3GPP access network over a MME and a non-3GPP access network over a first AMF entity. Further, the method includes obtaining, by the second AMF entity, a context from the MME and a non-3GPP context from the first AMF entity. Further, the method includes sending, by the second AMF entity, a NAS message (e.g., registration accept or registration reject or network initiate detach message) with an indication to register again for the non-3GPP access network with the second AMF entity. Further, the method includes receiving, by the second AMF entity, an update registration procedure to register the UE again for the non-3GPP access network and creating an N2 interface between a N3IWF and the second AMF entity.

Embodiments herein disclose a method for handling registration and session management in a wireless communication system. The method includes registering, by a UE, with a Mobility Management Entity (MME) through a 3GPP access network and a first AMF entity through a non-3GPP access network. Further, the method includes triggering, by the UE, a registration procedure to a second AMF entity from the MME. Further, the method includes configuring, by the UE, indication indicating the second AMF entity to obtain the non-3gpp access from the first AMF entity. Further, the method includes sending, by the UE, the GUTI maintained on the non-3GPP access to the second AMF entity to bind a N2AP UE-TNLA with a N3IWF interface i.e. the UE has to use the GUTI received over the 3GPP access from the second AMF for routing purpose (i.e. to N3IWF) over the non-3GPP access however the registration message shall contain the GUTI which identifies the first AMF so that message reach the second AMF and the second AMF can fetch context from the first AMF.

Embodiments herein disclose a method for handling registration and session management in a wireless communication system. The method includes registering, by a UE, with an AMF entity for a 3GPP access context and a non-3GPP access context. Further, the method includes detecting, by the UE, an intersystem change from a fifth generation (5G) network to a fourth generation (4G) network over a 3GPP access network. Further, the method includes configuring, by the UE, transfer of a 3GPP access context from the AMF entity to a MME entity and continuously maintaining the non-3GPP access context with the AMF through an N3IWF for non-3GPP access.

Embodiments herein disclose a method for handling registration and session management in a wireless communication system. The method includes receiving, by a UE, a paging message indicating a non-3GPP access from a 3GPP access network. Further, the method includes detecting, by the UE, that a connection management (CM) state of the non-3GPP access is in a connected mode or in a process of going into the connected mode. Further, the method includes performing one of: ignoring the paging message indicating for non-3GPP access or sending a service request message without indicating an allowed PDU session status IE to an Access Management Function (AMF) entity.

Embodiments herein disclose a method for handling registration and session management in a wireless communication system. The method includes receiving, by an AMF entity, a service request message from a UE over a non-3GPP access network. Further, the method includes activating, by the AMF entity, a PDU on the non-3GPP access network. Further, the method includes receiving, by the AMF entity, a service request message without indicating a PDU session identifier. Further, the method includes sending, by the AMF entity, a Radio Resource Control (RRC) connection release message to the UE.

Embodiments herein disclose a method for handling registration and session management in a wireless communication system. The method includes receiving, by a UE, one of a paging message indicating a non-3GPP access or a notification message indicating a non-3GPP access from the 3GPP access network. Further, the method includes detecting, by the UE, that a CM state of the non-3GPP access network is in a CM idle state. The UE responds with a service request message including allowed PDU session status IE. Further, the method includes detecting, by the UE, that a non-3GPP access network service is available and the non-3GPP access network moves to a connected mode. Further, the method includes performing one of: not triggering a service request message over a non-3GPP access network for a PDU which is allowed to be reactivated in the 3GPP access network prior to a service request procedure for the 3GPP access network is completed or triggering a service request message for a PDU which is not allowed to be activated over the 3GPP access network or triggering a service request message for the PDU based on an uplink data which is not allowed to be activated over the 3GPP access network based on an uplink data.

Embodiments herein disclose a method for handling registration and session management in a wireless communication system. The method includes receiving, by a UE, a paging message indicating a non-3GPP access from a 3GPP access network. Further, the method includes detecting, by the UE, that a service request message sent with allowed PDU session status IE to an AMF entity has failed and a retry timer has started. Further, the method includes detecting, by the UE, that a CM state of a non-3GPP access network has moved a connected mode. The UE stops the retry timer and aborts a service request procedure over the 3GPP access network. Further, the method includes sending, by the UE, a service request message comprising an uplink data status information element (IE) to the AMF entity over the non-3GPP access network, wherein a PDU associated with the non-3GPP access network allowed to be moved to the 3GPP access network is included in the uplink data status IE. Alternatively, the AMF entity aborts the paging with access type as the non-3GPP access and directly establishes the Dedicated Radio Bearer (DRB) over the non-3GPP access network.

Embodiments herein disclose a method for handling registration and session management in a wireless communication system. The method includes sending, by an AMF entity, a paging message indicating a non-3GPP access to a UE over a 3GPP access network. Further, the method includes receiving, by the AMF entity, a service request message from the UE over a non-3GPP access network. Further, the method includes activating, at the AMF entity, a PDU on the non-3GPP access network. Further, the method includes processing, at the AMF entity, a service request message and not activating the PDU for the non-3GPP access network over the 3GPP access network, where the PDU is activated over the non-3GPP access network.

Embodiments herein disclose a method for handling registration and session management in a wireless communication system. The method includes sending, by an AMF entity, a paging message indicating a non-3GPP access to a UE over a 3GPP access network. Further, the method includes receiving, by the AMF entity, a service request message from the UE over a non-3GPP access network and detecting that the AMF entity is in the process of activating a PDU on the 3GPP access network. Further, the method includes processing, at the AMF entity, a service request message, aborting the PDU activation for the non-3GPP access network over the 3GPP access network, and activating the PDU over the non-3GPP access network.

Embodiments herein disclose an UE for handling registration and session management in a wireless communication system. The UE includes a context matching controller coupled to a memory and a processor. The context matching controller is configured to register to a first core network entity over a 3GPP access network and a non-3GPP access network. Further, the context matching controller is configured to trigger a registration procedure to a second core network entity over the 3GPP access network when a periodic timer of the UE expires in an OOS state. Further, the context matching controller is configured to receive a NAS message (e.g. registration accept or registration reject or detach message with non-3GPP indication) with an indication to register again for the non-3GPP access network with the core network AMF entity over the 3GPP access network. Further, the context matching controller is configured to reinitiate the registration procedure to register again for the non-3GPP access with the second core network entity through the non-3GPP access network.

Embodiments herein disclose an AMF entity for handling registration and session management in a wireless communication system. The AMF entity includes a context matching controller coupled to a memory and a processor. The context matching controller is configured to receive a registration procedure from a UE over a 3GPP access network. The UE is registered to the 3GPP access network over a MME and a non-3GPP access network over another AMF entity. Further, the context matching controller is configured to obtain a context from the another AMF entity. Further, the context matching controller is configured to send a NAS message (e.g., registration accept or reject message) with an indication to register again for the non-3GPP access network with the AMF entity. Further, the context matching controller is configured to receive an update registration procedure to register the UE again for the non-3GPP access network and creating a N2 interface between a N3IWF and the second AMF entity.

Embodiments herein disclose a UE for handling registration and session management in a wireless communication system. The UE includes a context matching controller coupled to a memory and a processor. The context matching controller is configured to register with a MME through a 3GPP access network and a first AMF entity through a non-3GPP access network. Further, the context matching controller is configured to trigger an update registration procedure to a second AMF entity from the MME. Further, the context matching controller configures a GUTI mapped from the 3GPP access network and an indication indicating the second AMF entity to obtain the non-3gpp access from the first AMF entity. Further, the context matching controller is configured to send the GUTI to the second AMF entity to bind a N2AP UE-TNLA with a N3IWF interface.

Embodiments herein disclose an AMF entity for handling registration and session management in a wireless communication system. The core network entity (i.e., AMF entity) in 5GS is capable of supporting both the 3GPP access and non-3GPP access context. When intersystem change happens to the 4G network, the UE registers with the MME. In prior art for the context transfer between legacy RAT's the complete UE context is transferred to a target core network node, But here the problem is the target core network node MME do not support the non-3GPP access context thus when the UE moves to 4G RAT the non-3GPP access context will be lost, to solve this problem a solution is proposed. In the proposed method, the UE includes a context matching controller coupled to a memory and a processor. The context matching controller is configured to register with an AMF entity for a 3GPP access context and a non-3GPP access context. The context matching controller is configured to detect an intersystem change from a 5G network to a 4G network over a 3GPP access network. The context matching controller configures transfer of a 3GPP access context from the AMF entity to a MME entity and continuously maintaining the non-3GPP access context with the AMF through an N3IWF.

Embodiments herein disclose a UE for handling registration and session management in a wireless communication system. The UE includes a context matching controller coupled to a memory and a processor. The context matching controller is configured to receive a paging message indicating a non-3GPP access from a 3GPP access network and detect that a CM state of the non-3GPP access is in a connected mode or in a process of going into the connected mode. Further, the context matching controller is configured to perform one of: ignore the paging message indicating for non-3GPP access or send a service request message without including Allowed PDU session status IE to an AMF entity.

Embodiments herein disclose an AMF entity for handling registration and session management in a wireless communication system. The AMF entity includes a context matching controller coupled to a memory and a processor. The context matching controller is configured to receive a service request message from a UE over a non-3GPP access network. Further, the context matching controller is configured to activate a PDU on the non-3GPP access network and receive a service request message without indicating a PDU session identifier. Further, the context matching controller is configured to send a RRC connection release message to the UE.

Embodiments herein disclose a UE for handling registration and session management in a wireless communication system. The UE includes a context matching controller coupled to a memory and a processor. The context matching controller is configured to receive one of a paging message indicating a non-3GPP access or a notification message indicating a non-3GPP access from the 3GPP access network. The context matching controller is configured to detect that a CM state of the non-3GPP access network is in a CM idle state and a connected mode. The UE responds with a service request message including allowed PDU session status IE. The context matching controller is configured to detect that a non-3GPP access network service is available and the non-3GPP access network moves to a connected mode. The context matching controller is configured to perform one of: not trigger a service request message over a non-3GPP access network for a PDU which is allowed to be reactivated in the 3GPP access network prior to a service request procedure for the 3GPP access network is completed or triggering a service request message for a PDU which is not allowed to be activated over the 3GPP access network or triggering a service request message for the PDU based on an uplink data which is not allowed to be activated over the 3GPP access network based on an uplink data.

Embodiments herein disclose a UE for handling registration and session management in a wireless communication system. The UE includes a context matching controller coupled to a memory and a processor. The context matching controller is configured to receive a paging message indicating a non-3GPP access from a 3GPP access network and detect that a service request message sent with allowed PDU session status IE to an AMF entity has failed and a retry timer has started. The context matching controller is configured to detect that a CM state of a non-3GPP access network is in a connected mode. The UE stops the retry timer and aborts a service request procedure over the 3GPP access network. The context matching controller is configured to send a service request message including an uplink data status information element (IE) to the AMF entity over the non-3GPP access network, wherein a PDU associated with the non-3GPP access network allowed to be moved to the 3GPP access network is included in the uplink data status IE. Alternatively, the AMF entity aborts the paging with access type as the non-3GPP access and directly establishes the Dedicated Radio Bearer (DRB) over the non-3GPP access network.

Embodiments herein disclose an AMF entity for handling registration and session management in a wireless communication system. The AMF entity includes a context matching controller coupled to a memory and a processor. The context matching controller is configured to send a paging message indicating a non-3GPP access to a UE over a 3GPP access network. The context matching controller is configured to receive a service request message from the UE over a non-3GPP access network and activate a PDU on the non-3GPP access network. The context matching controller is configured to process a service request message and not activating the PDU for the non-3GPP access network over the 3GPP access network, where the PDU is activated over the non-3GPP access network.

Embodiments herein disclose an AMF entity for handling registration and session management in a wireless communication system. The AMF entity includes a context matching controller coupled to a memory and a processor. The context matching controller is configured to send a paging message indicating a non-3GPP access to a UE over a 3GPP access network. The context matching controller is configured to receive a service request message from the UE over a non-3GPP access network and detect that the AMF entity is in a process of activating a PDU on the 3GPP access network. The context matching controller is configured to process a service request message and not activating the PDU for the non-3GPP access network over the 3GPP access network, where the PDU is already activated over the non-3GPP access network.

Embodiments herein disclose a method for handling registration and session management in a wireless communication system. There are multiple situations wherein it is beneficial to restrict the usage of a PDU session to a particular access or RAT. For example, the network may configure to use a IOT PDU session only in non-3GPP access as its less costly from operation perspective for network to manage it. Thus, the network can either configure this information in the UE or it can provide a message indicating on which access or RAT a particular PDU session has to operate. In the proposed method, the method includes storing, by a UE, an information related to a PDU session. The PDU session belongs to at least one of a 3GPP access, a non-3GPP access, a 3G RAT, a 4G RAT, a 5G RAT and a like so. Further, the method includes activating, by the UE, the PDU session for the at least one of the 3GPP access, the non-3GPP access, the 3G RAT, the 4G RAT, and the 5G RAT based on the stored information. Further, the method includes rejecting, by a core network entity, an activation request and sending indicating a cause that the UE is not allowed to activate the PDU session, when the UE triggers the PDU session activation for the at least one of the 3GPP access, the non-3GPP access, the 3G RAT, the 4G RAT, and the 5G RAT. The core network entity provides the information on which at least one of the 3GPP access, the non-3GPP access, the 3G RAT, the 4G RAT, and the 5G RAT of the PDU session is allowed to be activated. If the network indicates to the UE that the PDU session is not supposed to operate in a particular RAT or access then UE can search to get the PDU session activated over other access or RAT or perform PLMN selection register on other PLMN which can provide service to the UE for that particular PDU session over the same access or RAT on which the UE previously received the reject cause.

Embodiments herein disclose a system for handling registration and session management in a wireless communication system. The system includes UE and a core network entity. The UE is configured to store an information related to a PDU session. The PDU session belongs to at least one of a 3GPP access, a non-3GPP access, a 3G RAT, a 4G RAT, and a 5G RAT. The UE is configured to activate the PDU session for the at least one of the 3GPP access, the non-3GPP access, the 3G RAT, the 4G RAT, and the 5G RAT based on the stored information. The core network entity is configured to reject an activation request and send indicating a cause that the UE is not allowed to activate the PDU session, when the UE triggers the PDU session activation for the at least one of the 3GPP access, the non-3GPP access, the 3G RAT, the 4G RAT, and the 5G RAT. The core network entity provides the information on which at least one of the 3GPP access, the non-3GPP access, the 3G RAT, the 4G RAT, and the 5G RAT of the PDU session is allowed to be activated.

In an embodiment, the UE, while activating a PDU session, indicates the UE policy whether the PDU session is allowed to be re-activated over non-3GPP access or not. This information is used by the network to determine if the UE has to be paged with access type as non-3GPP access if the UE is in IDLE mode over non-3GPP access. If the UE policy indicates that a particular PDU session is allowed to be activated over the 3GPP access and there is a downlink data only then the AMF will page with non-3GPP access type.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Consider a scenario in which a user equipment (UE) is registered to same network through a 3GPP access as well as a non-3GPP access and a periodic timer of the UE expires in Out Of service state (OOS) (in 3GPP access). After some time, when the UE came back in a service, then the UE triggers periodic registration in a 5G network, at this time, an Access Management Function (AMF) entity has deleted a context of the UE for 3GPP access. Further, various mechanisms for non 3GPP access handling in the 5G network are not available in the existing methods and systems.

Thus, it is desired to address the above mentioned disadvantages or other shortcomings or at least provide a useful alternative.

Embodiments herein achieve a method for handling registration and session management in a wireless communication system. The method includes registering, by a User Equipment (UE), to a first core network entity over a 3GPP access network and a non-3GPP access network. Further, the method includes triggering, by the UE, a registration procedure to a second core network entity over the 3GPP access network when a periodic timer of the UE expires in an OOS state. Further, the method includes receiving, by the UE, a NAS message (e.g., registration accept or reject message) with, over the 3GPP access network, an indication to register for the non-3GPP access network with the second core network entity. Further, the method includes reinitiating the registration procedure to register again for the non-3GPP access with the second core network entity.

Referring now to the drawings, and more particularly to FIGS. 2, 3, 5, 7-9, 11, 13, and 16-36, where similar reference characters denote corresponding features consistently throughout the figures, there are shown preferred embodiments.

FIG. 1 illustrates a scenario in which the AMF 200 has deleted a context of a UE 100 for 3GPP access.

Referring to FIG. 1, consider a scenario in which the UE 100 registered to same network through a 3GPP access as well as an non-3GPP access and a periodic timer of the UE 100 expires in an Out of service (OOS) (in the 3GPP) at 1-3. At 4-6, after some time, when the UE 100 came back in a service, then the UE 100 triggers a registration in the 5G, at this time the AMF 200 has deleted the context of the UE 100 for the 3GPP access. In this scenario, a behavior of the AMF 200 is not currently defined.

Figure 2:
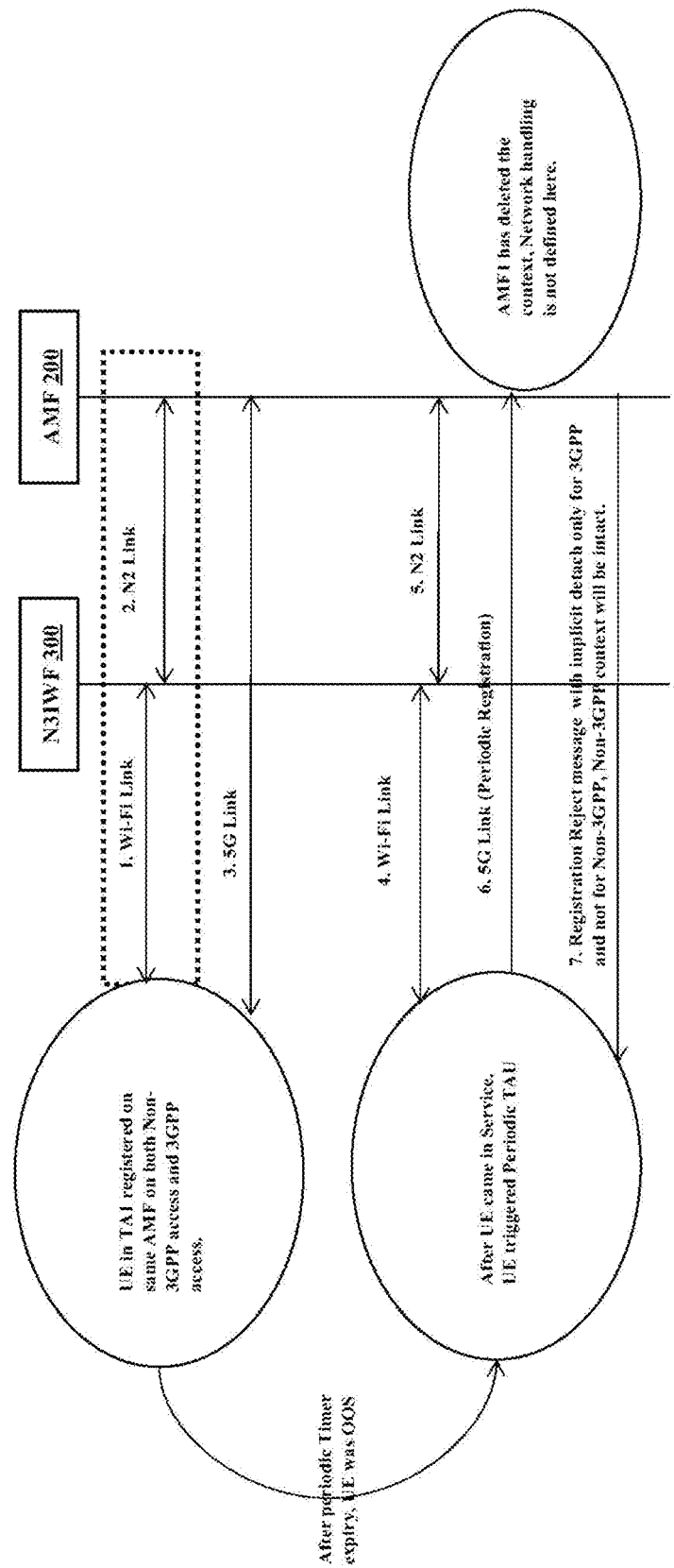
FIG. 2 illustrates a sequence diagram in which AMF sends registration reject to indicate that the UE context is not available (e.g., implicit detach) only for 3GPP, according to an embodiment of the present invention.

FIG. 2 illustrates a sequence diagram in which AMF 200 sends registration reject to indicate that the UE context is not available (e.g., implicit detach) only for 3GPP, according to an embodiment of the present invention. Consider a scenario in which the UE 100 is registered to same network through the 3GPP access as well as the non-3GPP access and the periodic timer of the UE 100 expires in the OOS (in the 3GPP) at 1-3. At 4-6, after some time, when the UE 100 came back in the service, then the UE 100 triggers (periodic) registration in the 5G network. In this scenario, the AMF 200 has deleted the context of the UE 100 for the 3GPP access. Thus, the AMF 200 should send indication that 3GPP context is not available (e.g., implicit detach) at 7, the UE 100 shall consider it's still attached to the non-3GPP and re-attempt registration request over the 3GPP access.

Figure 3:
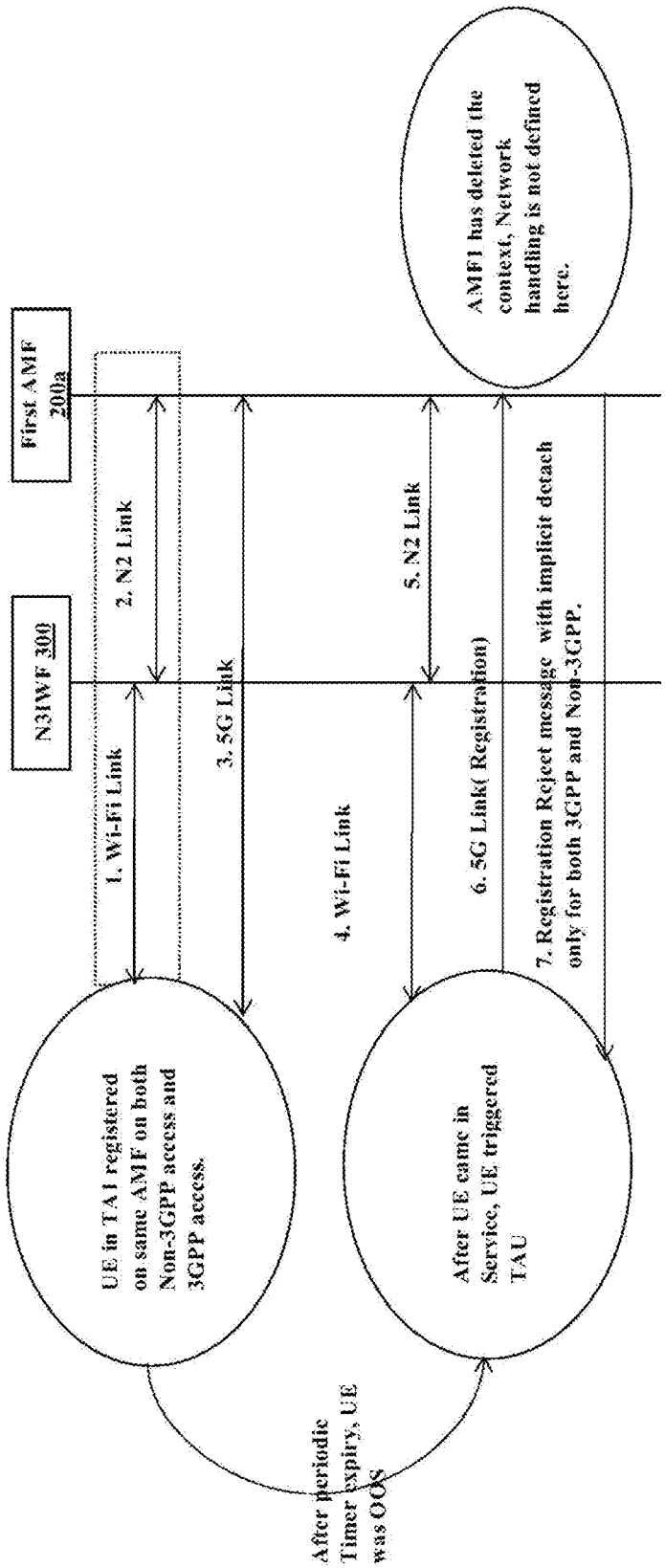
FIG. 3 illustrates a sequence diagram in which the AMF sends a non-access stratum (NAS) message (e.g. registration reject) with the implicit detach for both 3GPP access as well as non-3GPP access, according to an embodiment of the present invention.

FIG. 3 illustrates a sequence diagram in which the AMF 200 sends a non-access stratum (NAS) message (e.g. registration reject or detach message) with the implicit detach for both 3GPP access as well as non-3GPP access, to the UE over 3GPP access according to an embodiment of the present invention.

At 1-3, when the UE 100 is already registered to same network through the 3GPP access as well as the non-3GPP access, and the periodic timer of the UE 100 expires that the UE 100 was in the OOS in the 3GPP. At 4-6, after some time, when the UE 100 came back in the service, the UE 100 triggers the periodic registration in the 5G network. At this time the AMF 200 has deleted the context of the UE 100 for the 3GPP access. At 7, the AMF 200 should send the NAS message (e.g. registration reject with implicit detach or detach message) for both 3GPP access as well as Non-3GPP access. The UE 100 shall consider that context of both the access is not available and the UE 100 shall retrigger the registration request on both 3GPP and non-3GPP.

Figure 4:
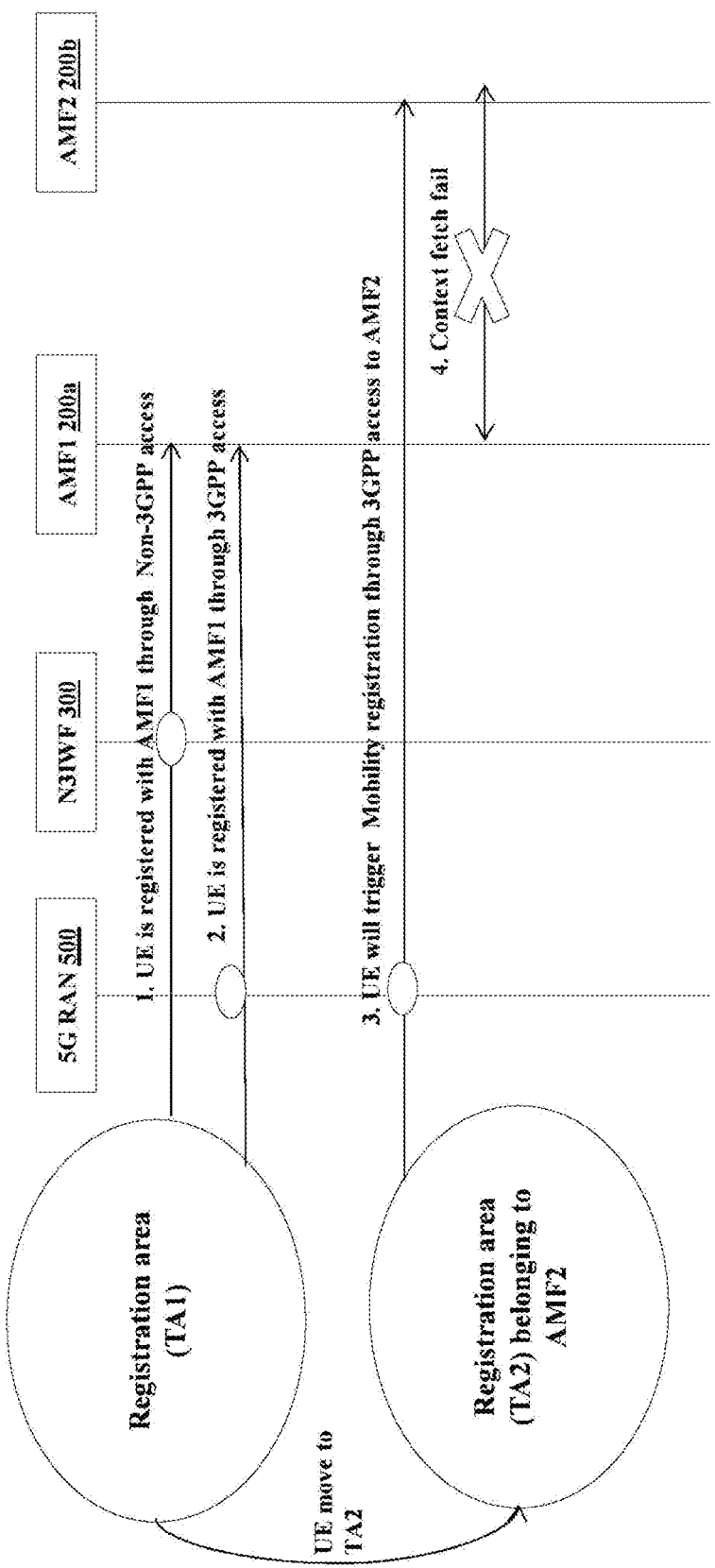
FIG. 4 illustrates a scenario in which a second AMF is not able to fetch the context from a first AMF via a communication_UE_context_transfer.

FIG. 4 illustrates a scenario in which the second AMF 200b is not able to fetch the context from the first AMF 200a via a communication_UE_context_transfer.

Referring to FIG. 4, when the UE 100 is already registered to same network through the 3GPP access as well as the non-3GPP access over same AMF i.e. first AMF 200a and when the UE 100 is moved to a new AMF i.e. second AMF 200b and triggered the mobility registration through the 3GPP access. However, the second AMF 200b is not able to fetch the context from the first AMF 200a via a communication_UE_context_transfer, then how the second AMF 200b will manage the registration context for both 3GPP access and non-3GPP access is not handled at 1-4.

Figure 5:
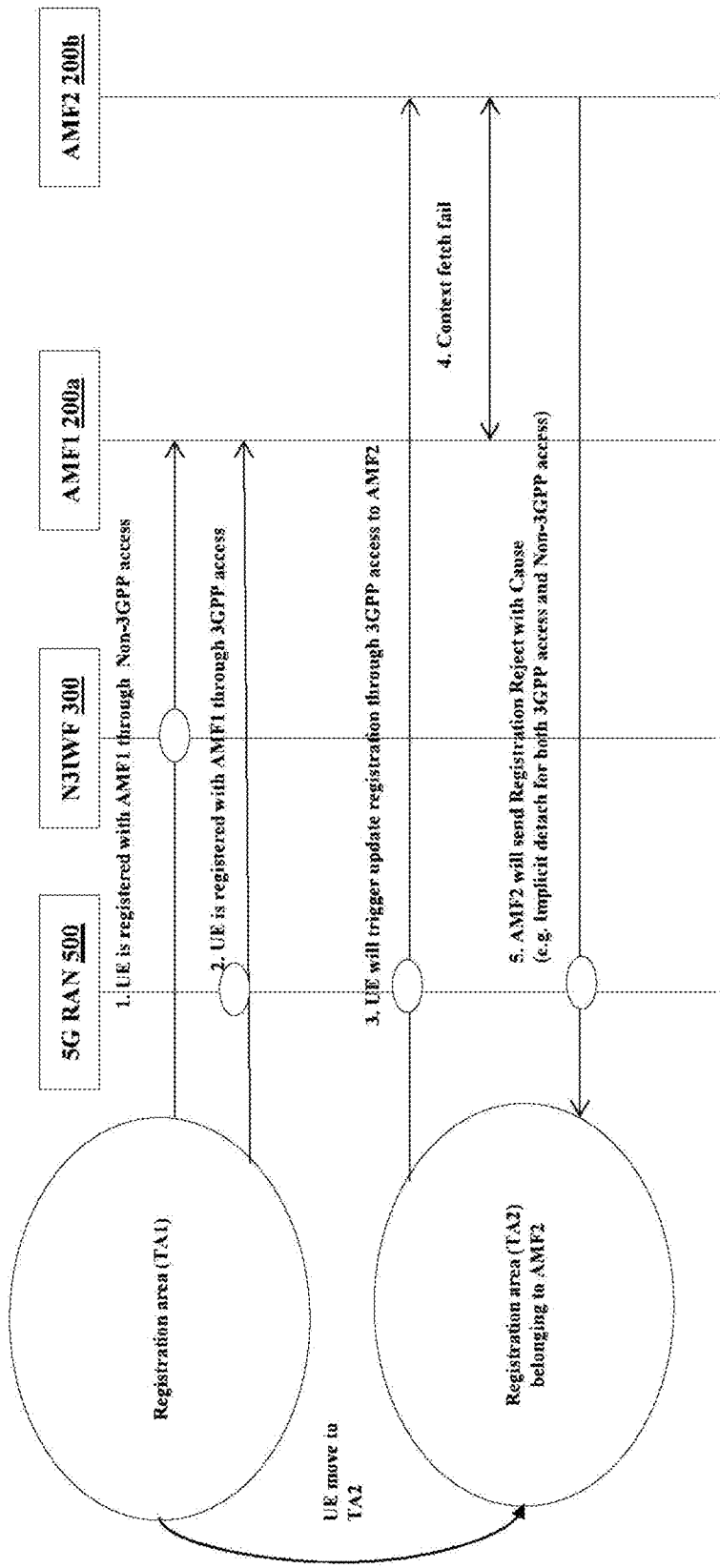
FIG. 5 illustrates a sequence diagram in which the AMF shall send a NAS message (e.g., registration reject) with a cause e.g., implicit detach or the like indicating to a UE that the UE shall initiate registration procedure on both 3GPP access and non-3GPP access, according to an embodiment of the present invention.

FIG. 5 illustrates a sequence diagram in which the AMF 200 shall send the NAS message (e.g., registration reject) with a cause e.g., implicit detach or the like indicating to the UE 100 that the UE 100 shall initiate registration procedure on both 3GPP access and non-3GPP access, according to an embodiment of the present invention.

Referring to FIG. 5, when the UE 100 is already registered to same network through 3GPP access as well as non-3GPP access over the same AMF i.e. the first AMF 200a or the UE 100 is registered over the 3GPP access with the MME 400 and for non-3GPP access with the AMF i.e. first AMF 200a and when the UE 100 is moved to the new AMF i.e. second AMF 200b and triggered a mobility registration through the 3GPP access. However, the second AMF 200b is not able to fetch the context from the first AMF 200a via the Communication_UE_context_transfer. In this case, the second AMF 200b can send the NAS message (e.g., registration reject or deregister message or the like) with the cause (e.g., implicit detach or re-register the like) indicating to the UE 100 that the UE 100 shall initiate registration procedure on both 3GPP access and non-3GPP access at 1-5.

Figure 6:
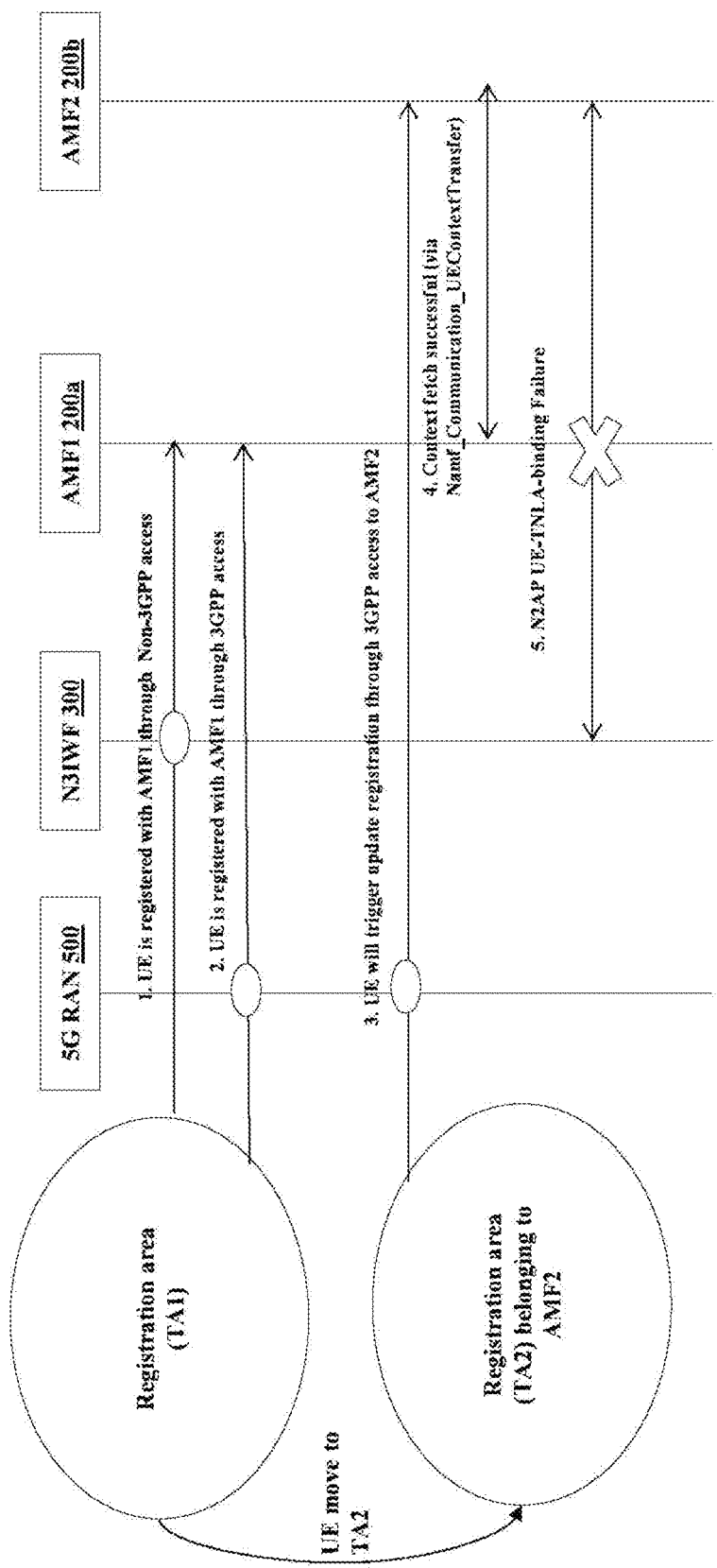
FIG. 6 illustrates a scenario in which the second AMF is not able to successfully do the N2AP UE-TNLA-binding with a N3IWF interface.

FIG. 6 illustrates a scenario in which the second AMF 200b is not able to successfully do the N2AP UE-TNLA-binding with the N3IWF interface 300.

Figure 7:
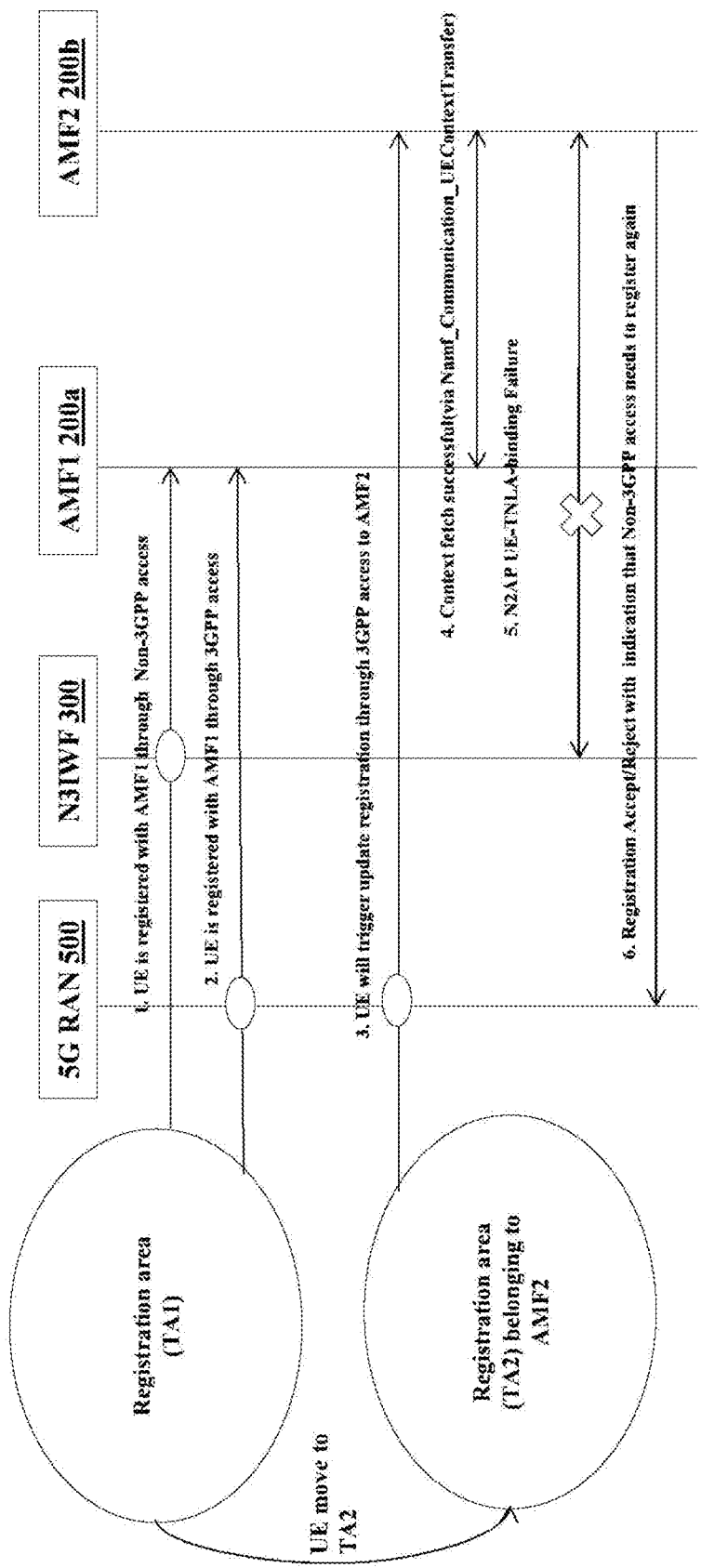
FIG. 7 illustrates a sequence diagram in which the second AMF sends a registration accept/registration reject with an indication to register for the non-3GPP access to the UE, according to embodiments of the present invention.

FIG. 7 illustrates a sequence diagram in which the second AMF 200b sends a registration accept/registration reject with an indication to register for the non-3GPP access to the UE 100, according to embodiments as disclosed herein.

Referring to FIG. 7, consider the UE 100 is already registered to same network through the 3GPP access as well as the non-3GPP access over same AMF i.e. first AMF 200a at 1-2 or alternatively, the UE 100 is registered with first AMF 200a for the non-3GPP access and the MME 400 for the 3GPP access. At 2-7, when the UE 100 is moved to the new AMF i.e. second AMF 200b and triggered the mobility registration through the 3GPP access. The second AMF 200b is able to fetch the context from first AMF 200a via the communication_UE_context_transfer successfully, alternately the context fetch fails for non-3GPP access. The second AMF 200b is not able to successfully do N2AP UE-TNLA-binding with the N3IWF interface 300. The second AMF 200b shall send the registration accept/registration reject or detach message to the UE 100 with the indication (cause) to register again for the non-3GPP access. The UE 100 shall consider that its currently not registered with the second AMF 200b for the non-3GPP access and initiates the NAS message over the non-3GPP access (example registration procedure or service request) to establish the non-3GPP access context and to re-create the N2 interface between the N3IWF 300 and the AMF 200 (Alternately, this can be done after retry timer expires).

Alternately, the UE 100 can run a retry timer and re-initiate a registration procedure over the 3GPP access and with this registration message, the second AMF 200b shall again try to create the N2AP UE-TNLA-binding. Alternately, the second AMF 200b shall provide registration accept to the UE 100 and run a retry timer after which the second AMF 200b shall retry to create the N2 interface with N3IWF 300 and this is transparent to the UE 100.

The purpose of the 5GS registration result information element is to specify the result of a registration procedure. The 5GS registration result information element is coded as shown in table 1 and table 2. The 5GS registration result is a type 4 information element with a length of 3 octets. With code-points 3GPP access, the UE 100 shall consider itself self-registered only for 3GPP access and re-initiate the registration procedure for non-3GPP access. With code-point 3GPP access and non-3GPP access, the UE 100 shall consider the context transfer from non-3GPP access was successful and the UE 100 is registered to both 3GPP and non-3GPP access with the same AMF.

TABLE 1

| 8 | 7 | 6 | 5 | 4 | 3 | 2 | 1 | |
|---|---|---|---|---|---|---|---|---|
| | | 5 GS registration result IEI | | | | | | octet 1 |
| | Length of 5 GS registration result contents | | | | | | | octet 2 |
| 0 | 0 | 0 | 0 | S | 5 GS registration result value | | | octet 3 |
| S p a r e | S p a r e | S P a r e | S P a r e | M S a l l o w e d | | | | |

TABLE 2

5GS registration result value (octet 3, bits 1 to 3)

Bits

3GPP access
Non-3GPP access
3GPP access and non-3GPP access
reserved

Figure 8:
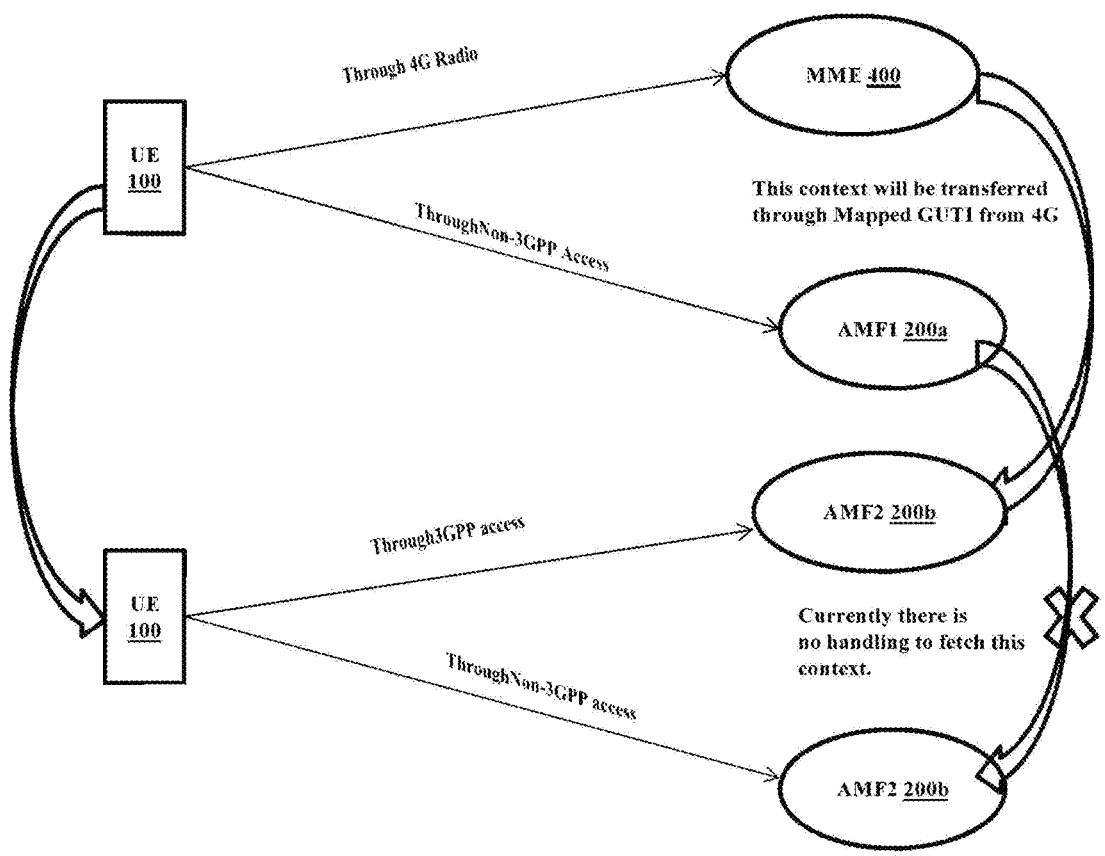
FIG. 8 illustrates a scenario in which the UE attaches to different AMF on same PLMN, according to embodiments of the present invention.

FIG. 8 illustrates a scenario in which the UE 100 attaches to different AMF on same PLMN, according to embodiments as disclosed herein.

Referring to FIG. 8, consider the UE 100 attached to a MME 400 through a 4G radio and to the first AMF 200a through the non-3GPP access. During mobility, the UE 100 is moved to the second AMF 200b from the MME 400 and provided the mapped GUTI from the 4G in the NAS message (e.g., registration request message). Based on mapped Globally Unique Temporary Identifier (GUTI), the second AMF 200b will fetch the context from the MME 400, but the first AMF 200a (on which the UE 100 is attached through the non-3GPP access) is on the same PLMN as the context of the second AMF 200b will not be fetched. This will lead to the UE 100 attaching to different AMF on same PLMN and miss in paging messages for non-3GPP access.

Figure 9:
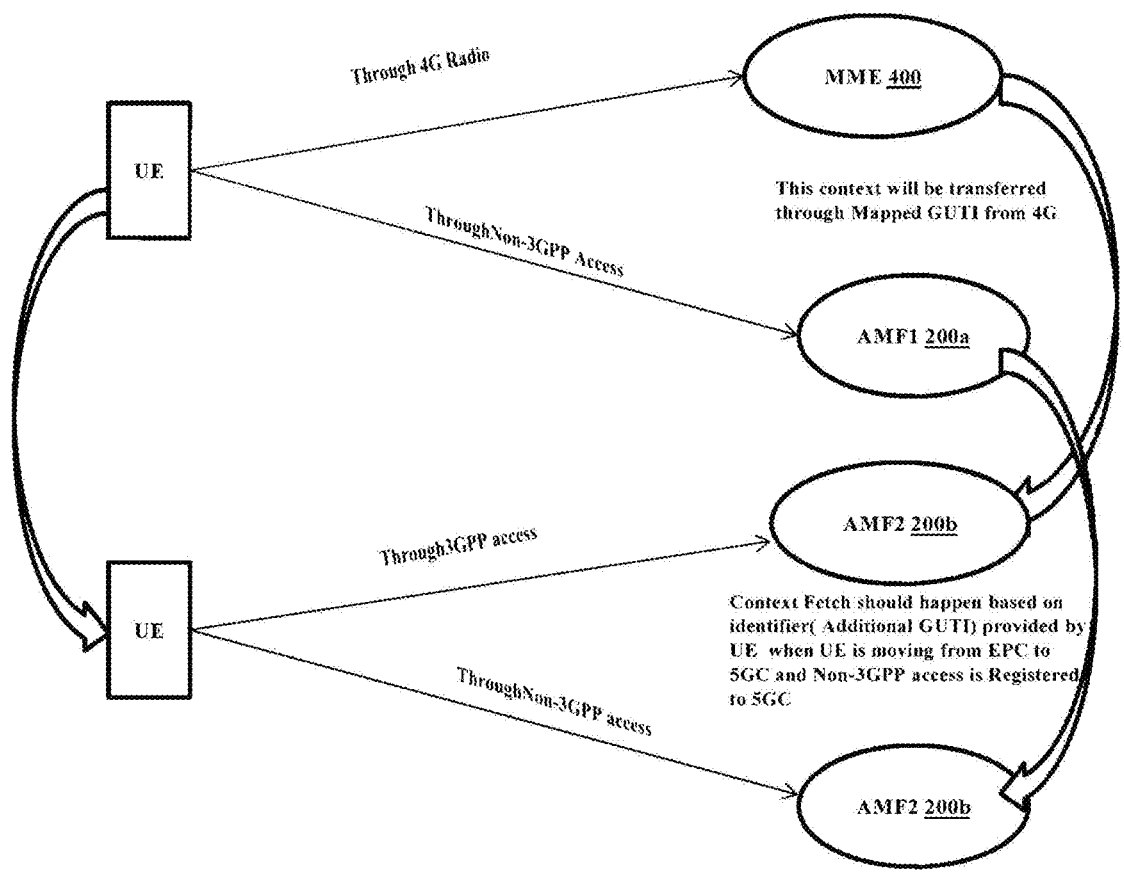
FIG. 9 illustrates a sequence diagram in which the UE performs registration of type "mobility registration update" in a 5G Core Network (5GC) with two indications one of the indication is 5G-GUTI mapped from 4G-GUTI and shall also indicate to the AMF (e.g., second AMF) the other indication so that the second AMF understands that it shall fetch the non-3gpp access from old AMF (e.g., first AMF) possibly by including additional identifier (e.g. additional GUTI of 5G for the non-3gpp access) if the UE is registered over the non-3GPP access, according to an embodiment of the present invention.

FIG. 9 illustrates a sequence diagram in which the UE 100 performs registration of type "mobility registration update" in a 5G Core Network (5GC) with two indications one of the indication is 5G-GUTI mapped from 4G-GUTI and shall also indicate to the AMF (e.g., second AMF 200b) so that the second AMF 200b understands that the second AMF 200b shall fetch the non-3gpp access from old AMF (e.g., first AMF 200a) possibly by including additional identifier (e.g. additional GUTI of 5G for the non-3gpp access) if the UE 100 is registered over the non-3GPP access, according to an embodiment of the present invention.

Referring to FIG. 9, for mobility from the EPC to the 5GC, the UE 100 performs the registration procedure in the 5GC with 5G-GUTI mapped from 4G-GUTI and shall include additional GUTI of 5G if the UE 100 is registered for the non-3GPP access Based on indication or identifier (In an example, Additional GUTI) which also indicates TLNA binding (Non 3GPP access registration) required, the new AMF will fetch the context from old AMF and do the context transfer from old AMF to the new AMF, additionally new AMF will also do N2AP UE-TNLA-binding with N3IWF interface 300.

Figure 10:
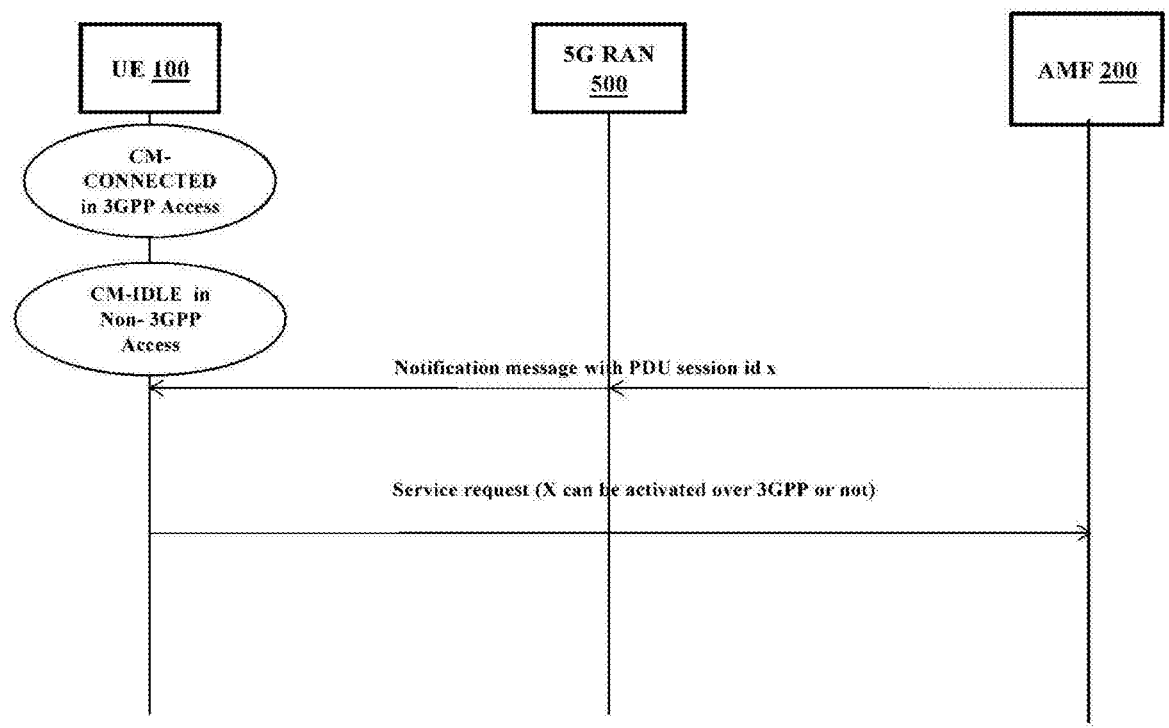
FIG. 10 illustrates a scenario in which the AMF sends notification message indicating the access in which AMF wants to get the responses, according to of the present invention.

FIG. 10 illustrates a scenario in which the AMF 200 sends notification message with the related access type to the UE 100. The notification message indicates the access in which the AMF 200 wants to obtain the responses.

The UE 100, upon reception of the notification message, shall reply to the 5GC via the 3GPP access using the NAS service request message, which shall contain an indication on whether the PDU session can be re-activated over 3GPP.

Figure 11:
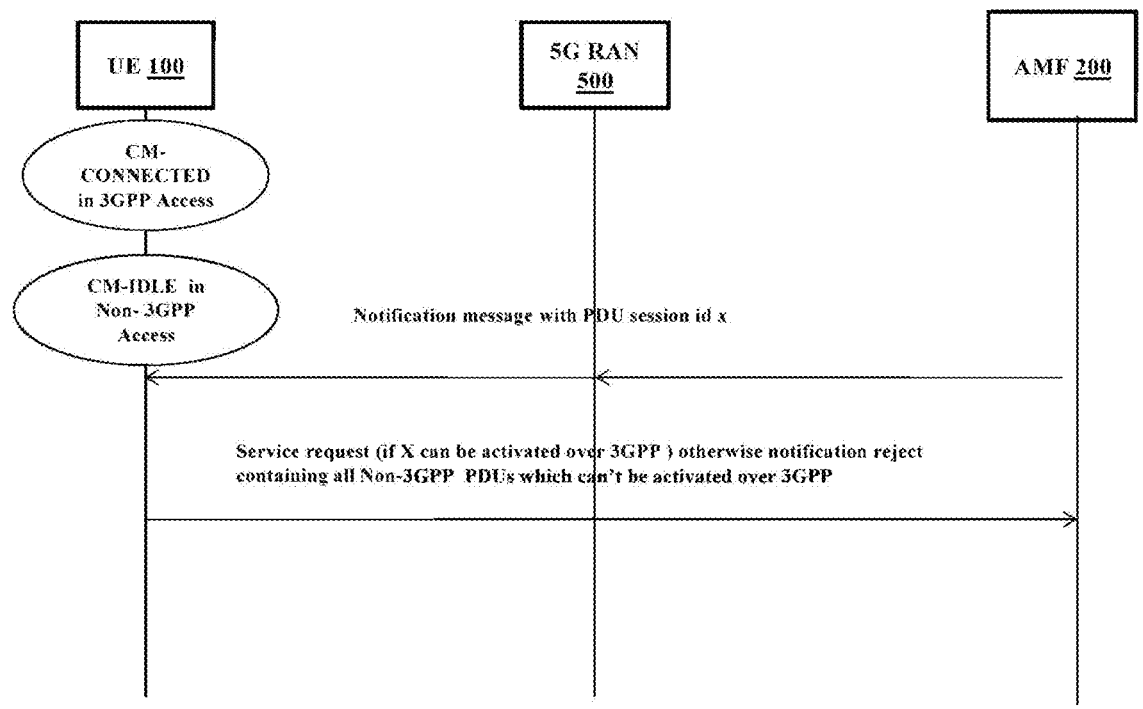
FIG. 11 illustrates a sequence diagram in which the UE sends a service request otherwise notification reject containing all non-3GPP PDUs which can't be activated over the 3GPP, according to an embodiment of the present invention.

FIG. 11 illustrates a sequence diagram in which the UE 100 sends the service request otherwise notification reject containing all non-3GPP PDUs which can't be activated over the 3GPP, according to an embodiment of the present invention. The above described solution is not clear what the UE 100 will do if the PDU session id cannot be moved to the 3GPP and how the AMF 200 will behave for subsequent paging procedure. In the proposed method, the method can be used to send a notification reject message to the network in the CM CONNECTED mode indicating what all PDU session of non-3GPP which can't be moved to the 3GPP. The AMF 200 will use this information to not send the paging notification for PDU session ids which are indicated in the notification reject in subsequent attempts over the 3GPP.

Figure 12:
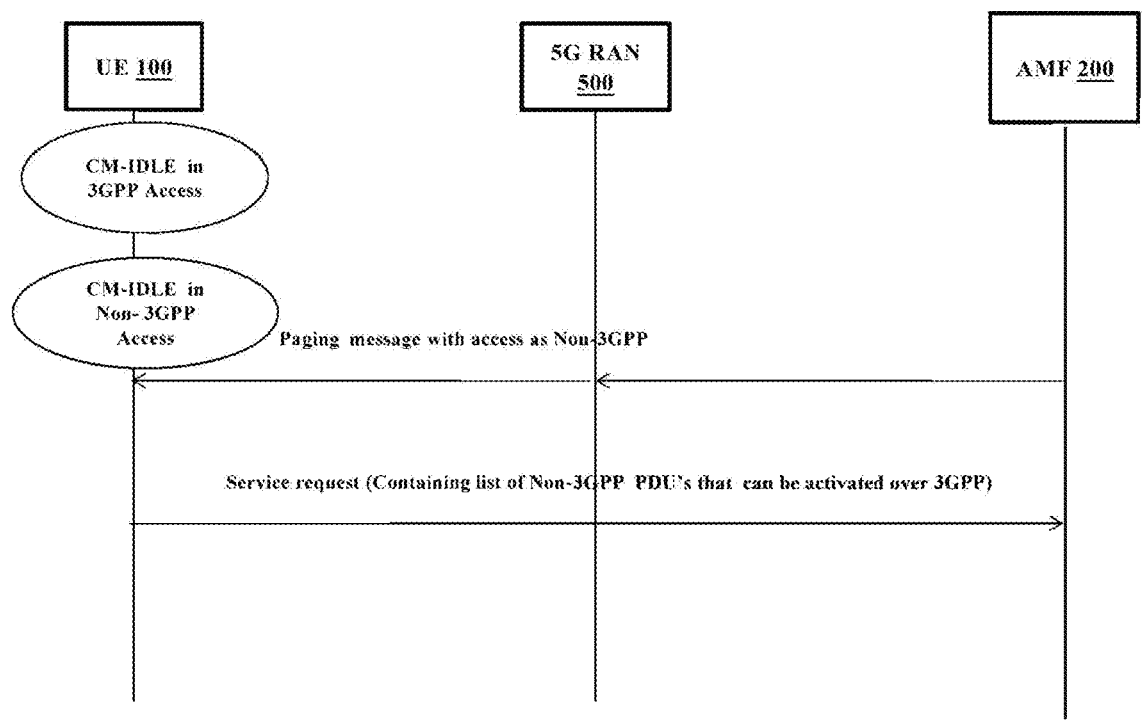
FIG. 12 illustrates a scenario in which the service request (containing list of the non-3GPP PDU's) is activated over 3GPP.

FIG. 12 illustrates a scenario in which the service request (containing list of the non-3GPP PDU's) is activated over 3GPP. Currently, the UE 100 sends of non-3GPP PDUs which can be activated over the 3GPP. The AMF 200 checks if the list sent by the UE 100 has the PDU session id because of which paging was sent for the downlink data, and will establish user plane resources for that PDU. However further handling for the AMF 200 is not defined.

Figure 13:
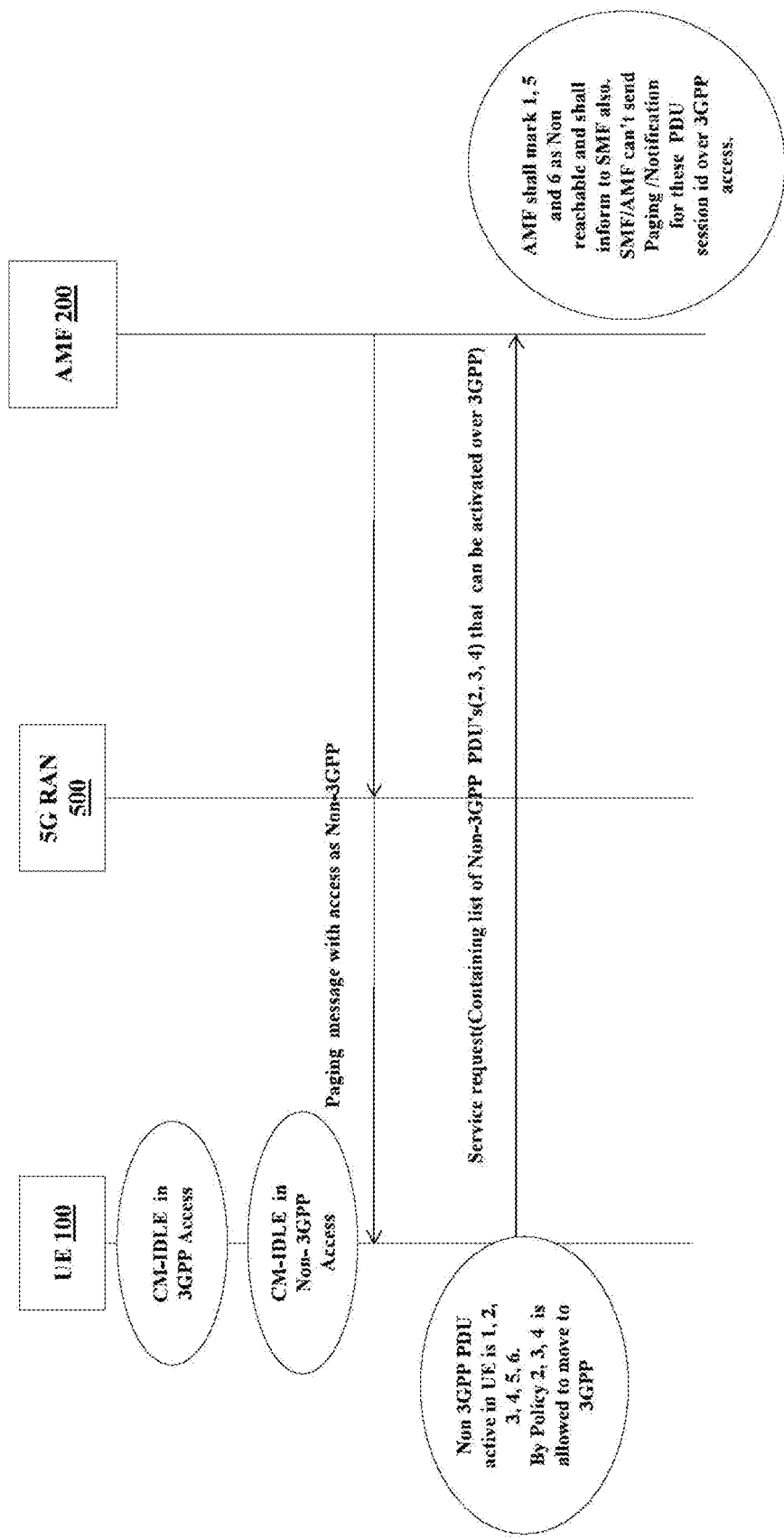
FIG. 13 illustrates a scenario in which the service request (containing list of the non-3GPP PDU's) is activated over 3GPP, according to an embodiment of the present invention.

FIG. 13 illustrates a scenario in which the service request (containing list of the non-3GPP PDU's) is activated over 3GPP, according to an embodiment of the present invention.

When there are say X number of PDU over non-3GPP and non-3GPP is in the CM IDLE state and the UE 100 receives the paging over 3GPP access for the non-3GPP access PDUs, then the UE 100 based on policy send service request with list of PDUs which can be moved from the non-3GPP to the 3GPP. The AMF 200 on receiving the list of PDUs will determine if the list contains the PDU session id for which paging was sent over 3GPP access. If the list contains the PDU session id, the network will establish the user plane resources for that PDU and send downlink data. Additionally, the AMF 200 shall determine what all PDU's can't be moved from non-3GPP to 3GPP and shall not send paging/notification for those PDU over 3GPP (example till an implementation dependent Timer). Alternatively, the UE 100 shall neglect the paging for "non-3GPP access" in 3GPP when the policy of the UE 100 doesn't allow the current activated all non-3GPP access PDU's to re-activate over the 3GPP access.

In the conventional methods, there is no mechanism for handling what will be the UE 100 and the network 200 behavior when PDN interworking is not there between the 4G network and the 5G network. Also, what will be the network behavior when say certain PDU are not supported in one RAT. The UE behavior for the case when network supports registration on one access and not on other access.

In the embodiment, the system is used to handle the dual registration in the wireless communication system. The system includes the UE 100 and the core network entity. The UE 100 is configured to store an information related to the PDU session. The PDU session belongs to at least one of a 3GPP access, a non-3GPP access, a 3G RAT, a 4G RAT, and a 5G RAT. Further, the UE 100 is configured to activate the PDU session for the at least one of the 3GPP access, the non-3GPP access, the 3G RAT, the 4G RAT, and the 5G RAT based on the stored information. The core network entity is configured to reject an activation request and send indicating a cause that the UE 100 is not allowed to activate the PDU session, when the UE triggers the PDU session activation for the at least one of the 3GPP access, the non-3GPP access, the 3G RAT, the 4G RAT, and the 5G RAT. The core network entity provides the information on which at least one of the 3GPP access, the non-3GPP access, the 3G RAT, the 4G RAT, and the 5G RAT of the PDU session is allowed to be activated.

Unlike conventional methods and systems, the proposed method indicates that there should be a field in a SIM card or network slice selection policy file which should indicate the RAT where PDU is supported based on interworking RAT could be 4G, 5G, Non-3GPP or their combination. If the UE 100 doesn't have subscription for the PDU session to be activated to certain access, then the network should give subscription based the reject cause. The reject cause can include the access where the PDU session is allowed or not allowed. The reject cause can include only 3GPP Access allowed, only Non-3GPP access allowed. This subscription information shall also be maintained in the SIM card which can give information that on which access subscription is there, only 3GPP access, only Non-3GPP access or both are allowed.

Further, if the UE 100 doesn't have subscription for the PDUs to certain access, then the network should give subscription based reject cause for PDN connectivity request reject cause can include the access where registration is allowed or not allowed. The reject cause can include, for e.g., only 3GPP access allowed, only non-3GPP access allowed, or none are allowed. This subscription information for PDUs shall also be maintained in the SIM card which can give information that on which access subscription is there, only 3GPP access, only non-3GPP access or both are allowed.

Issue scenario: The UE is in CM-IDLE state on Non-3gpp access, network triggered paging over 3GPP to re-activate PDU session associated to the non-3GPP access. The UE triggers service request procedure and includes list of PDU sessions associated with the non-3GPP access that can be re-activated over 3GPP (say PDU session #1, #2).

Simultaneously, if Wi-Fi becomes available, then the UE 100 triggers service request over Wi-Fi (i.e. non-3GPP access) too to move from IDLE to Connected state. The AMF 200 receives Service request from 3GPP and Non-3GPP both (i.e. collision cases).

Figure 14:
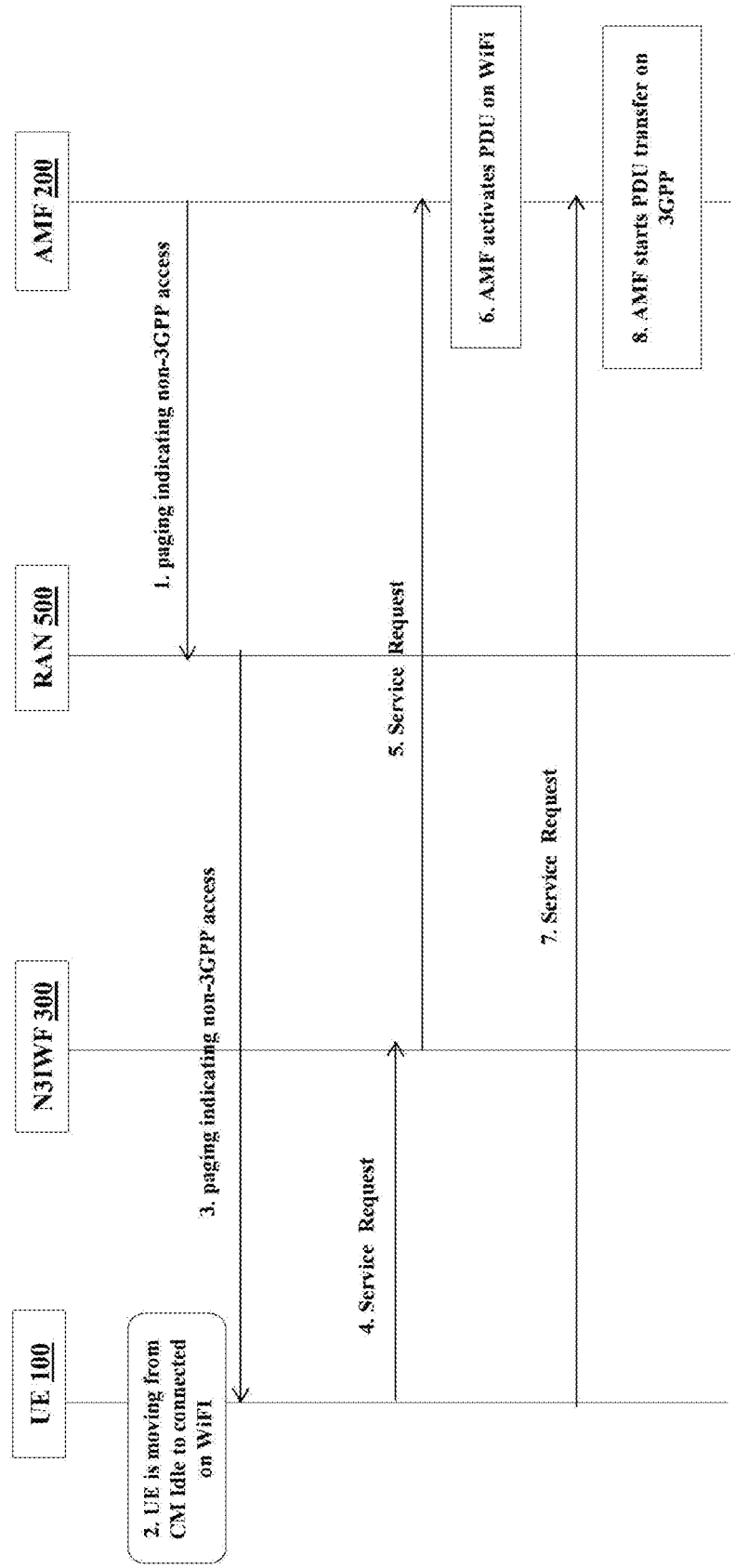
FIG. 14 and FIG. 15 are sequential diagrams illustrating inconsistent behaviour of the AMF as both service request arriving at different time and in different order.
Figure 15:
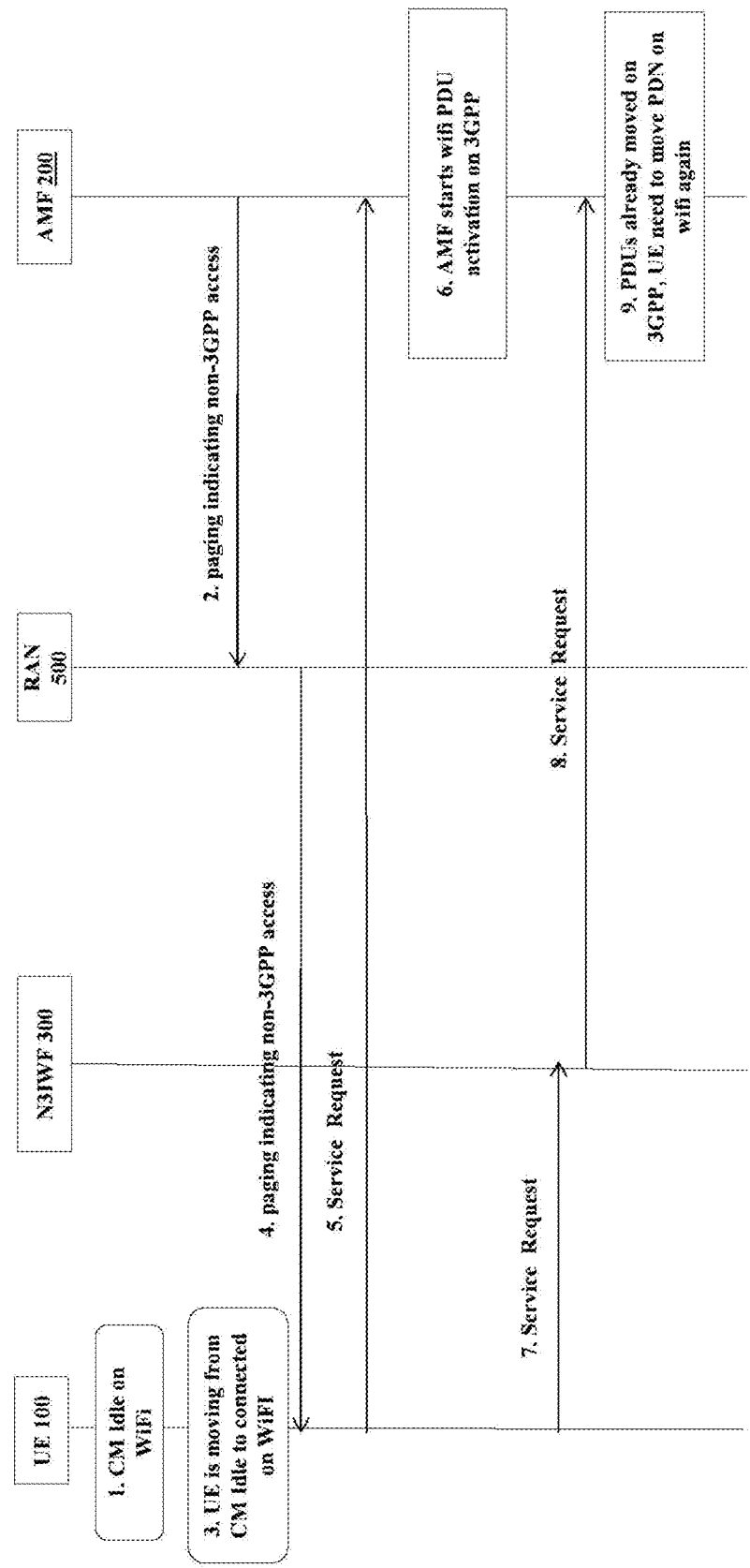

FIG. 14 and FIG. 15 are sequential diagrams illustrating inconsistent behaviour of the AMF 200 as both service request arriving at different time and in different order.

Case 1: If the AMF 200 receives service request from Wi-Fi first and later service request from 3GPP is received, then the AMF 200 has to change data path for the PDU sessions which the UE 100 has requested to activate over 3GPP (as shown in FIG. 14).

Case 2: If the AMF 200 receives the service request from 3GPP first and later service request from the Non-3GPP, then the AMF 200 has to change data path for PDU sessions first on 3GPP and later UE 100 need to move these PDUs to Wi-Fi due to UE policy (as shown in FIG. 14).

As shown in the FIG. 14, at 1, the AMF 200 sends the paging message indicating non-3GPP access to the RAN. At 2, the UE 100 is moving from the CM Idle to connected on the WiFi. At 3, the RAN 500 sends the paging message indicating non-3GPP access to the UE. At 4, the UE 100 sends the service request to the N3IWF 300 and at 5, the N3IWF 300 sends the service request to the AMF 200. At 6, the AMF 200 activates the PDU on the WiFi. At 7, the UE 100 sends the service request to the AMF 200. At 8, the AMF 200 starts the PDU transfer on 3GPP.

As shown in the FIG. 15, at 1, the CM Idle of the UE 100 is on WiFi. At 2, the AMF 200 sends the paging message indicating non-3GPP access to the RAN. At 3, the UE 100 is moving from the CM Idle to connected on the WiFi. At 4, the RAN 500 sends the paging message indicating non-3GPP access to the UE. At 5, the UE 100 sends the service request to the AMF 200. At 6, the AMF 200 starts Wi-Fi protocol data unit (PDU) activation on the 3GPP. At 7, the UE 100 sends the service request to the N3IWF 300. At 8, the N3IWF 300 sends the service request to the AMF 200. At 9, the PDUs already moved on 3GPP and the UE 100 needs to move packet data network (PDN) on Wi-Fi again.

Figure 16:
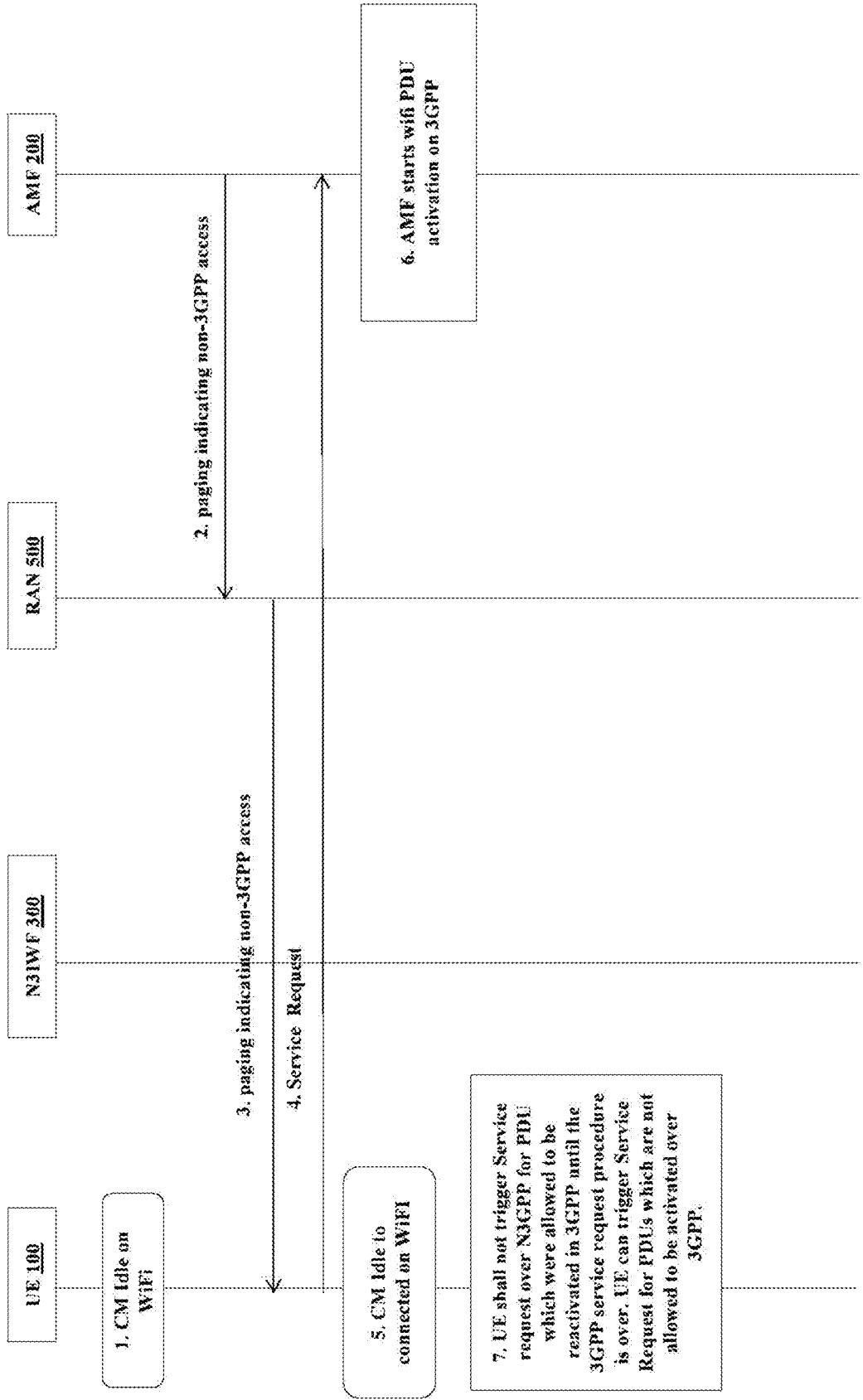
FIG. 16 illustrates a sequence diagram in which UE shall not trigger service request over the non-3GPP until the procedure is over on 3GPP, according to an embodiment of the present invention.

FIG. 16 illustrates a sequence diagram in which UE 100 shall not trigger service request over the non-3GPP until the procedure is over on 3GPP, according to an embodiment of the present invention.

If the service request over the non-3GPP access is triggered for the CM Idle to a CM connected transition, then the UE 100 should not trigger service request over the 3GPP in response to paging indicating non-3gpp access until the procedure is over on the non-3GPP. In general, if service request procedure is triggered over one RAT (3GPP or Non-3GPP) then same procedure should not trigger over other RAT (3GPP or Non-3GPP) (i.e. UE 100 shall maintain a single service request state machine for both 3GPP and non-3GPP).

As shown in the FIG. 16, at 1. The UE 100 is in CM Idle state on the WiFi. At 2, the AMF 200 sends the paging indicating non-3GPP access to the RAN. At 3, the RAN 500 sends the paging indicating the non-3GPP access to the UE 100. At 4, the UE 100 sends the service request to the AMF 200. At 5, the UE 100 moves to CM Idle state to connected state on the WiFi. At 6, the AMF 200 starts Wi-Fi PDU activation on the 3GPP network. At 7, the UE 100 shall not trigger service request over N3GPP for PDU which were allowed to be reactivated in the 3GPP network until the 3GPP service request procedure is over. Further, the UE 100 can trigger service request for PDUs which are not allowed to be activated over the 3GPP network.

Figure 17:
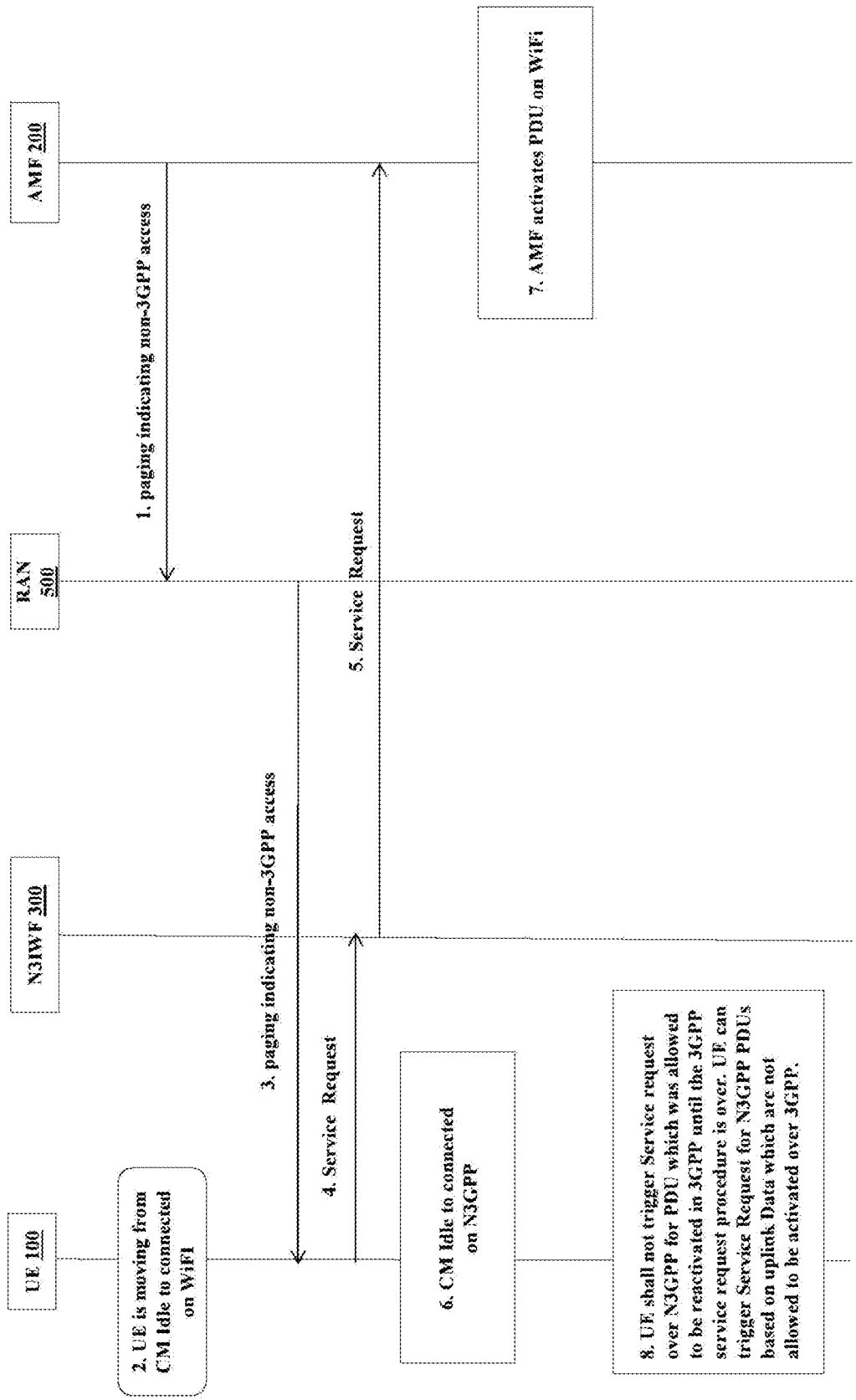
FIG. 17 illustrates a sequence diagram in which UE shall not trigger service request over the 3GPP in response to paging indicating non-3gpp access until the procedure is over on the non-3GPP, according to an embodiment of the present invention.

FIG. 17 illustrates a sequence diagram in which UE 100 shall not trigger service request over the 3GPP in response to paging indicating non-3gpp access until the procedure is over on the non-3GPP, according to an embodiment of the present invention.

The UE 100 ignores the paging with non-3gpp access when non-3gpp access is already in connected mode or in transition phase from IDLE to connected mode. (Or the UE 100 can send service request without PDN, so that the AMF 200 can release the connection without transferring PDN on the 3GPP network).

At 1, the AMF 200 sends the paging indicating the non-3GPP access to the RAN network 500. At 2, the UE 100 is moving from the CM idle state to connected state on the WiFi. At 3, the RAN 500 sends the paging indicating non-3GPP access to the UE 100. At 4, the UE 100 sends the service request to the N3IWF 300. At 5, the N3IWF 300 sends the service request to the AMF 200. At 6, the UE 100 moves to the CM Idle state to connected state on the N3GPP. At 7, the AMF 200 activates the PDU on WiFi. At 8, the UE 100 shall not trigger service request over N3GPP for PDU which was allowed to be reactivated in the 3GPP network until the 3GPP service request procedure is over. The UE 100 can trigger service request for N3GPP PDUs based on uplink data which are not allowed to be activated over the 3GPP network.

Figure 18:
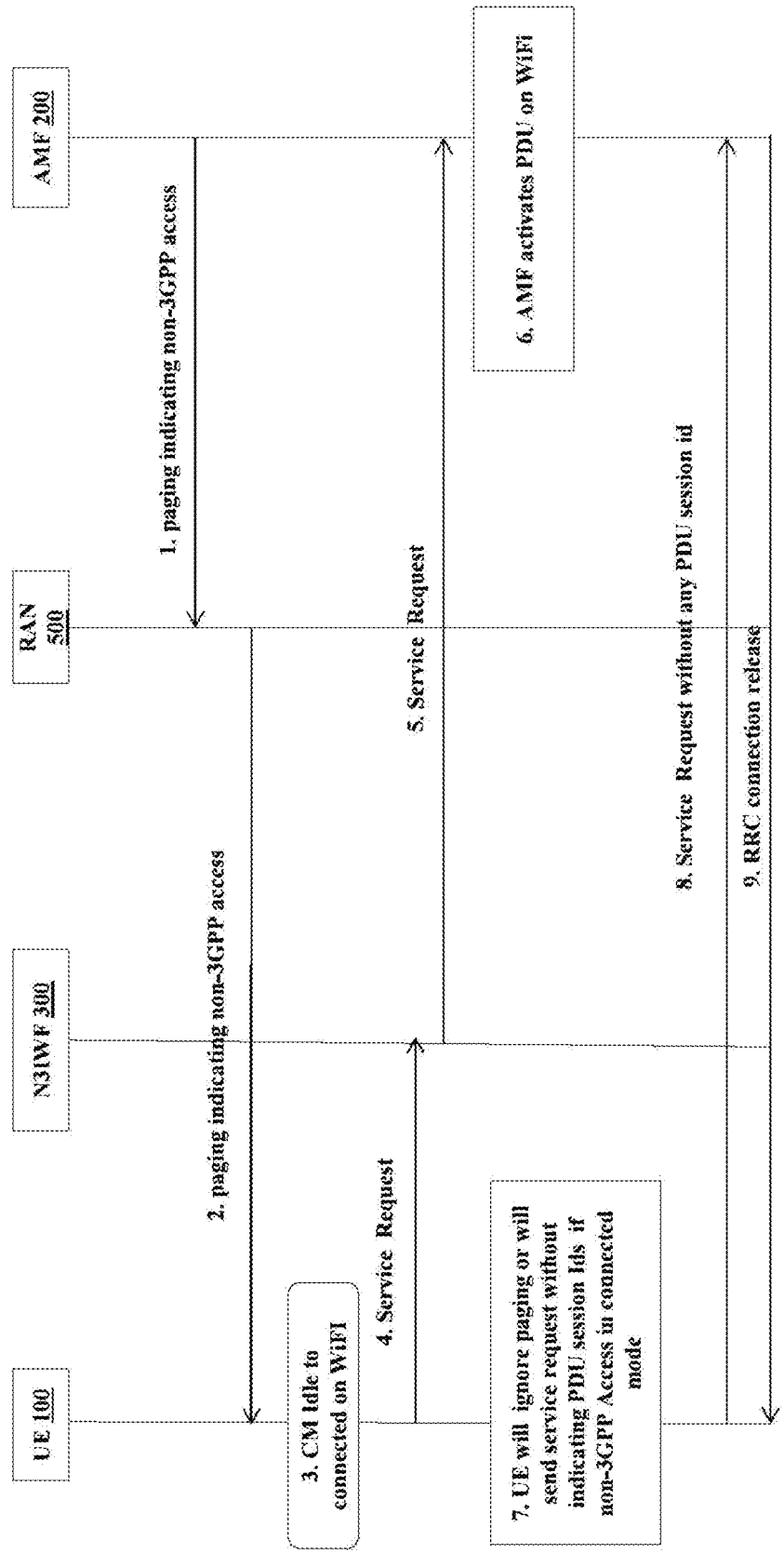
FIG. 18 illustrates a sequence diagram in which the UE ignores the paging with non-3gpp access when the non-3gpp of the UE is already in a connected mode, according to an embodiment of the present invention.

FIG. 18 illustrates a sequence diagram in which the UE 100 ignores the paging with non-3gpp access when the non-3gpp of the UE 100 is already in a connected mode, according to an embodiment of the present invention. Consider the scenario, at 1-5, the UE 100 is received paging on the 3GPP paging indicating the non-3GPP access, the UE 100 started service request but procedure could not be completed due to lower layers. The service request procedure would be attempted after the timer expiry (retry attempt), in between, the UE 100 found the non-3gpp (in an example, Wi-Fi coverage). The UE 100 shall abort the service request procedure on the 3GPP and shall continue service request over the Wi-Fi at 6. At 7, the AMF 200 activates the PDU on the Wi-Fi. At 8, the UE 100 sends the service request without any PDU session id to the AMF 200 and the AMF 200 sends the RRC connection release to the UE 100.

As shown in the FIG. 18, at 1, the AMF 200 sends the paging indicating non-3GPP access to the RAN. At 2, the RAN 500 sends the paging indicating the non-3GPP access to the UE 100. At 3, the UE 100 moves to the CM idle state to the connected state on the WiFi. At 4, the UE 100 sends the service request to the N3IWF 300. At 5, the N3IWF 300 sends the service request to the AMF 200. At 6, the AMF 200 activates PDU on the WiFi. At 7, the UE 100 will ignore paging or will send service request without indicating PDU session identifier if non-3GPP access in the connected mode. At 8, the UE 100 sends the service request without any PDU session id to the AMF 200. At 9, the AMF 200 sends the RRC connection release to the UE 100.

Figure 19:
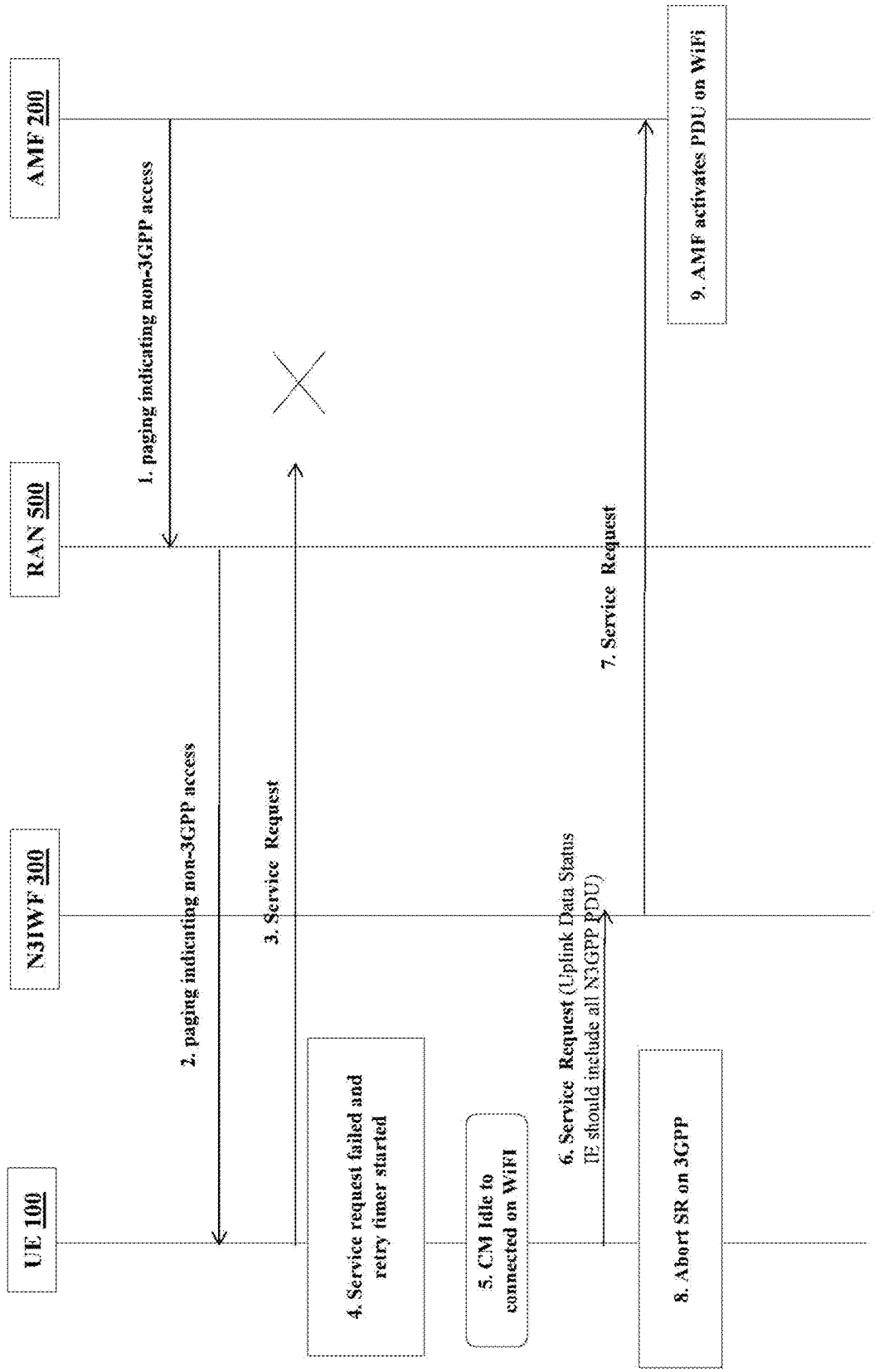
FIG. 19 illustrates a sequence diagram in which UE shall abort the service request procedure on the 3GPP and shall continue service request over the Wi-Fi, according to an embodiment of the present invention.

FIG. 19 illustrates a sequence diagram in which UE 100 shall abort the service request procedure on the 3GPP and shall continue service request over the Wi-Fi, according to an embodiment of the present invention.

At 1 and at 2, the UE 100 received paging on the 3GPP paging indicating the non-3GPP access. At 3, the UE 100 started the service request but procedure could not be completed due to lower layers. At 4-9, the service request procedure would be attempted after timer expiry (i.e., retry attempt) and in between, UE 100 is found the Wi-Fi coverage, so that the UE 100 shall abort the service request procedure on 3GPP and shall continue service request over the Wi-Fi.

Figure 20:
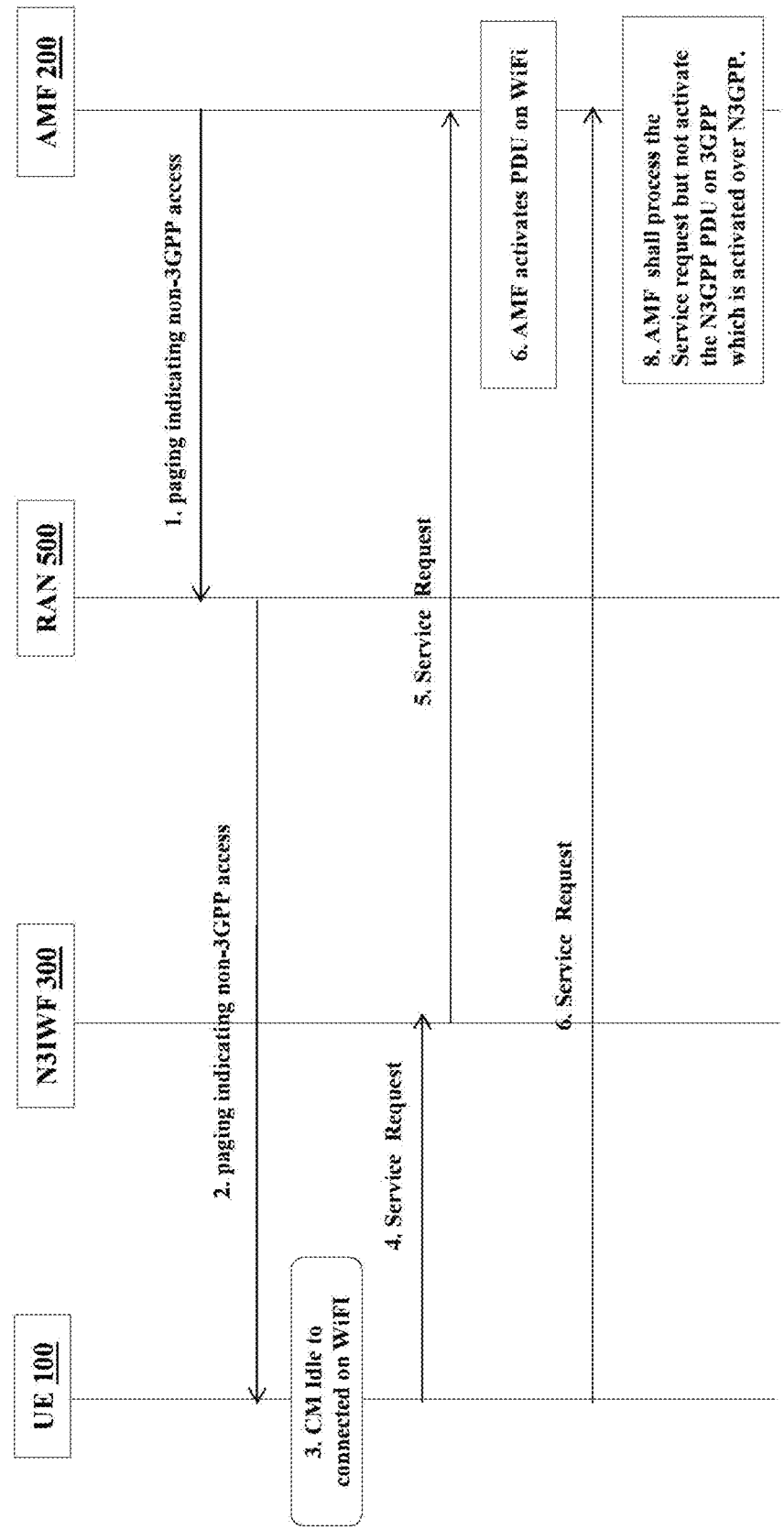
FIG. 20 illustrates a sequence diagram in which the AMF can ignore the service request (in response to the non 3gpp paging) if same PDU is already connected (or active) over the non 3GPP access (CM state for non-3gpp is connected), according to an embodiment of the present invention.

FIG. 20 illustrates a sequence diagram in which the AMF 200 can ignore the service request with allowed PDU session status IE (in response to the non 3gpp paging) if same PDU is already connected (or active) over the non 3GPP access (CM state for non-3gpp is connected), according to an embodiment of the present invention. The AMF 200 can ignore the service request (in response to the non 3gpp paging) if same PDU is already connected (or active) over the non 3GPP access (i.e., CM state for non-3gpp is connected).

If AMF 200 has received service request (in response to non 3gpp paging) over 3GPP and service request from Wi-Fi is also received simultaneously. In this case, AMF 200 shall abort PDN transfer on 3GPP and shall activate PDN over Wi-Fi. The AMF 200 should not send paging on 3gpp after this for Wi-Fi PDN i.e. paging with access type non-3GPP access.

As shown in the FIG. 20, at 1, the AMF 200 sends the paging indicating non-3GPP access to the RAN. At 2, the RAN 500 sends the paging indicating the non-3GPP access to the UE 100. At 3, the UE 100 moves to the CM idle state to the connected state on the WiFi. At 4, the UE 100 sends the service request to the N3IWF 300. At 5, the N3IWF 300 sends the service request to the AMF 200. At 6, the AMF 200 activates PDU on the WiFi. At 7, the UE 100 sends the service request to the AMF 200. At 8, the AMF 200 shall process the service request but not activate the N3GPP PDU on 3GPP which is activated over the N3GPP network.

Figure 21:
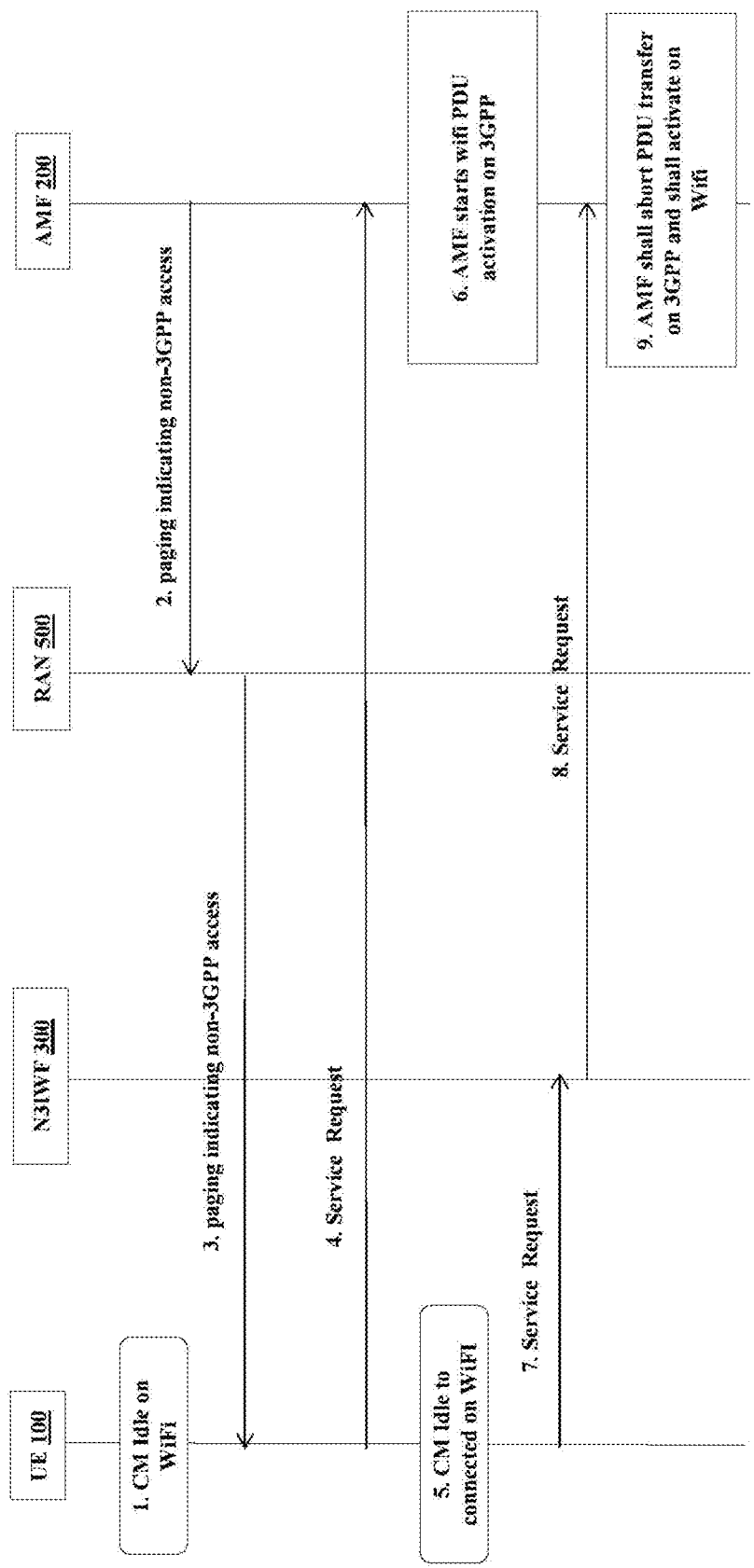
FIG. 21 illustrates a sequence diagram in which the AMF has received the service request (in response to non 3gpp paging) over the 3GPP and service request from the Wi-Fi simultaneously, according to an embodiment of the present invention.

FIG. 21 illustrates a sequence diagram in which the AMF 200 has received the service request (in response to non 3gpp paging) over the 3GPP and service request from the Wi-Fi simultaneously, according to an embodiment of the present invention.

If AMF 200 has received service request (in response to non 3gpp paging) over 3GPP and service request from Wi-Fi is also received simultaneously. In this case, the AMF 200 shall abort PDN transfer on 3GPP and shall activate PDN over Wi-Fi. The AMF 200 should not send paging on 3gpp after this for Wi-Fi PDN.

As shown in the FIG. 21, at 1, the UE 100 is in the CM Idle state on the WiFi. At 2, the AMF 200 sends the paging indicating non-3GPP access to the RAN. At 3, the RAN 500 sends the paging indicating the non-3GPP access to the UE 100. At 4, the UE 100 sends the service request to the AMF 200. At 5, the UE 100 moves to the CM idle state to the connected state on the WiFi. At 6, the AMF 200 starts Wi-Fi PDU activation on the 3GPP network. At 7, the UE 100 sends the service request to the N3IWF 300. At 8, the N3IWF 300 sends the service request to the AMF 200. At 9, the AMF 200 shall abort PDU transfer on 3GPP and shall activate on the Wi-Fi.

Figure 22:
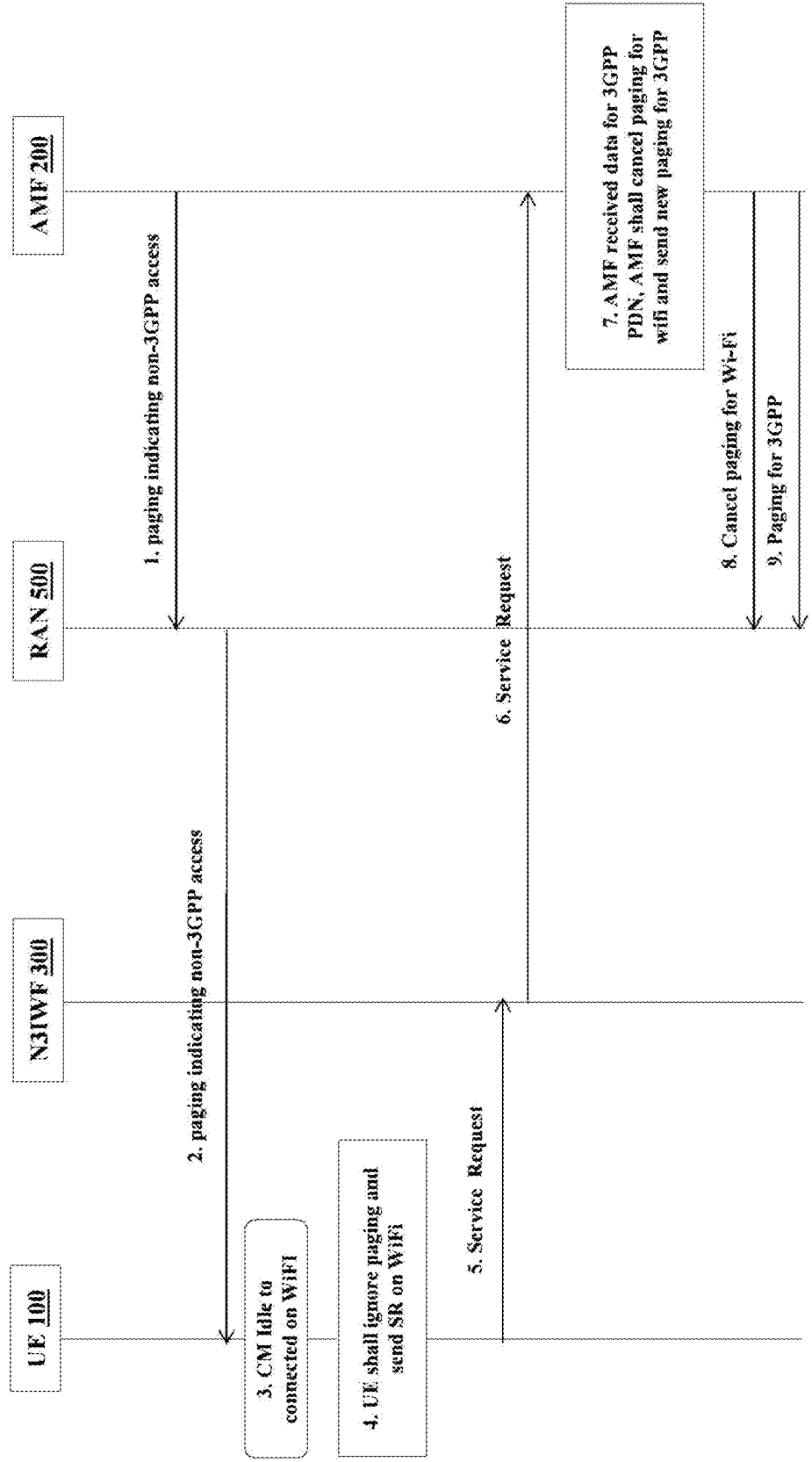
FIG. 22 illustrates a sequence diagram in which the AMF shall send new paging message with 3GPP access, according to an embodiment of the present invention.

FIG. 22 illustrates a sequence diagram in which the AMF 200 shall send new paging message with 3GPP Access, according to an embodiment of the present invention.

Consider, the AMF 200 sent paging for non-3gpp and UE 100 ignored the paging as the UE 100 is moving to the Wi-Fi. Once, the UE 100 is connected over the Wi-Fi, then the AMF 200 can do one more paging for 3GPP PDNs. The AMF 200 should send cancel paging for previous paging type (For example paging for non-3gpp). The AMF 200 should send new paging message with 3GPP Access. The E-NodeB shall send the latest available access type (Note: CM Idle to connect on Wi-Fi means CM IDLE to CM Connected state transition of non-3gpp access). If both 3GPP and non-3GPP access PDU session's data is pending on the network side when non-3GPP access is in the IDLE mode then the AMF 200 shall trigger procedure for paging with access type as non-3GPP access. This will avoid AMF paging twice as the UE 100 will move to connected mode in the 3GPP access, further the AMF 200 can establish the DRB for 3GPP access. Further the AMF 200 can send the downlink data of 3GPP access at the same time the AMF 200 will receive the allowed PDU session status IE to know the UE policy as to which PDU sessions can be moved from the non-3GPP access to the 3GPP access.

As shown in the FIG. 22, At 1, the AMF 200 sends the paging indicating non-3GPP access to the RAN. At 2, the RAN 500 sends the paging indicating the non-3GPP access to the UE 100. At 3, the UE 100 moves to the CM idle state to the connected state on the WiFi. At 4, the UE 100 shall ignore paging and sends the SR on the WiFi. At 5, the UE 100 sends the service request to the N3IWF 300. At 6, the N3IWF 300 sends the service request to the AMF 200. At 7, the AMF 200 received data for 3GPP PDN. The AMF 200 shall cancel paging for Wi-Fi to radio area network (RAN), at 8, and send new paging for 3GPP network at 9.

Figure 23:
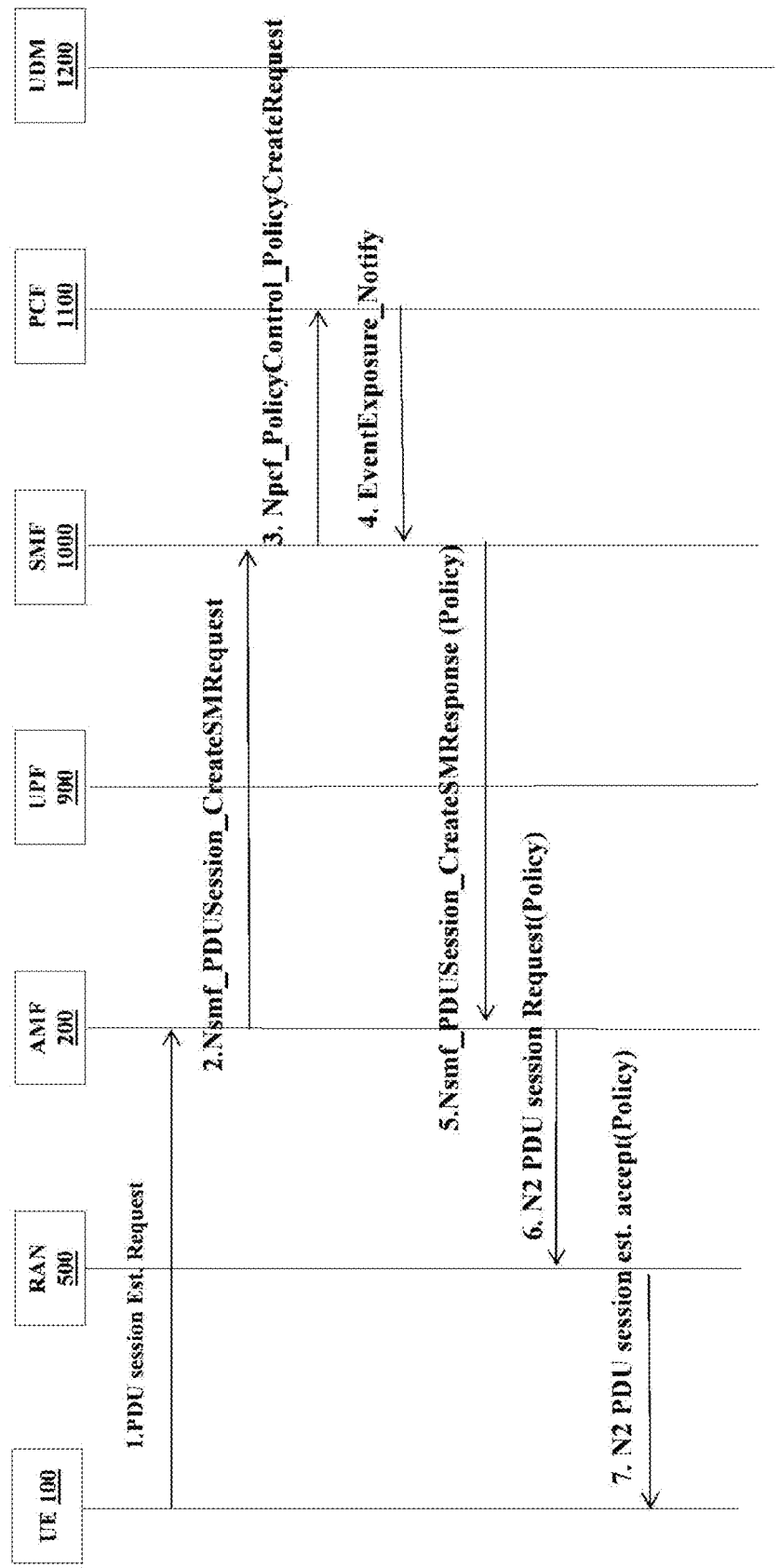
FIG. 23 is a sequence diagram in which the network doesn't have control to move specific PDN to specific RAT, according to embodiment of the present invention.

FIG. 23 is a sequence diagram in which the network doesn't have control to move specific PDN to specific RAT, according to embodiment as disclosed herein.

Case 1: in the existing methods, the network wants to restrict some PDN/DNN on the specific RAT (e.g., data on Wi-Fi only). It is possible that the user has subscription for voice and data on the Wi-Fi. In this case, the UE 100 can activate IMS PDN on 5G and the data PDN/DNN on Wi-Fi. But there is no method for keeping the data PDN/DNN only on the Wi-Fi.

Case 2, in the existing methods, the network wants to give priority to specific PDN/DNN on the specific RAT (e.g. priority of data Wi-Fi). There can be a scenario wherein the network wants to give priority of specific PDN/DNN to specific RAT (e.g. keep Data PDN on 5G if 5G not available, then Wi-Fi).

Case 3, in the existing methods, the network wants to give the condition for the PDN/DNN HO (e.g. Signal Condition, Packet delay etc.). All above policy can be configured by the network using ANDSF (FFS now). But it is possible that ANDSF is not available in certain PDNs/DNN so there shall be other mechanism to support the same.

Based on the proposed methods, the SMF 1000 will get the policy from PCF 1100 in step 4. The PCF 1100 can also change the policy later on. In that case, the network will follow the PDU session modification procedure to update the new policy.

As shown in the FIG. 23, at 1, the UE 100 sends the PDU session establishment request to the AMF. At 2, the AMF 200 sends the Nsmf_PDUSession_CreateSMRequest to the session management function (SMF) 1000. At 3, the SMF 1000 sends the Npcf_PolicyControl_PolicyCreateRequest to the PCF 1100. At 4, the PCF 1100 sends the EventExposure_Notify to the SMF 1000. The SMF 1000 sends the Nsmf_PDUSession_CreateSMResponse (Policy) to the AMF 200 at 5. The AMF 200 sends the N2 PDU session Request (Policy) to the RAN 500 at 6. At 7, the RAN 500 sends the N2 PDU session establishment accept to the UE 100.

The UE is configured to store an information related to a PDU session. The PDU session belongs to at least one of a 3GPP access, a non-3GPP access, a 3G RAT, a 4G RAT, and a 5G RAT. The UE is configured to activate the PDU session for the at least one of the 3GPP access, the non-3GPP access, the 3G RAT, the 4G RAT, and the 5G RAT based on the stored information. The core network entity is configured to reject an activation request and send indicating a cause that the UE is not allowed to activate the PDU session, when the UE triggers the PDU session activation for the at least one of the 3GPP access, the non-3GPP access, the 3G RAT, the 4G RAT, and the 5G RAT. The core network entity provides the information on which at least one of the 3GPP access, the non-3GPP access, the 3G RAT, the 4G RAT, and the 5G RAT of the PDU session is allowed to be activated.

Figure 24:
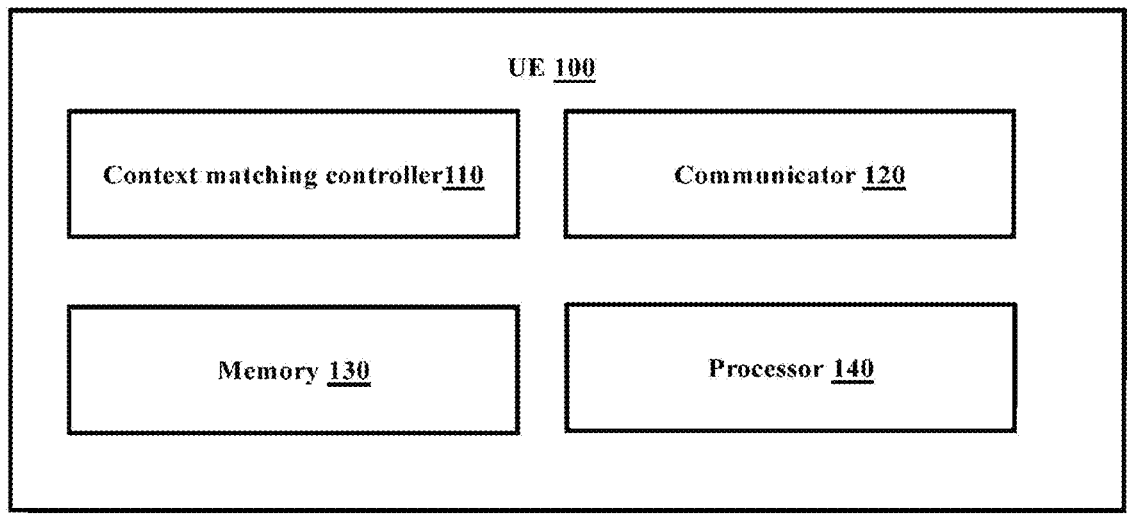
FIG. 24 is a block diagram of the UE, according to an embodiment of the present invention.

FIG. 24 is a block diagram of the UE 100, according to an embodiment of the present invention. The UE 100 includes a context matching controller 110, a communicator 120, a memory 130 and a processor 140. The processor 140 is coupled with the context matching controller 110, the communicator 120, and the memory 130.

In an embodiment, the context matching controller 110 is configured to register to the first AMF entity 200*a* over the 3GPP access network and the non-3GPP access network. Further, the context matching controller 110 is configured to trigger the update registration procedure to the second AMF entity 200*b* over the 3GPP access network when a periodic timer of the UE expires in an OOS state. Further, the context matching controller 110*a* is configured to receive the registration accept or reject message with the indication to register again for the non-3GPP access network with the second AMF entity 200*b* over the 3GPP access network. Further, the context matching controller 110 is configured to reinitiate the update registration procedure to register again for the non-3GPP access with the second AMF entity 200*b* over the non-3GPP access network.

In an embodiment, the context matching controller 110 is configured to register with the MME 400 through the 3GPP access network and the first AMF entity 200*a* through the non-3GPP access network. Further, the context matching controller 110 is configured to trigger the update registration procedure to the second AMF entity 200*b* from the MME 400. Further, the context matching controller 110 configures the GUTI mapped from the 3GPP access network and an indication indicating the second AMF entity 200*b* to obtain the non-3gpp access from the first AMF entity 200*a*. Further, the context matching controller 110 is configured to send the GUTI to the second AMF entity 200*b* to bind the N2AP UE-TNLA with the N3IWF interface 300.

In an embodiment, the context matching controller 110 is configured to receive the paging message indicating the non-3GPP access from the 3GPP access network and detect that a CM state of the non-3GPP access is in the connected mode or in a process of going into the connected mode. Further, the context matching controller 110 is configured to perform one of: ignore the paging message indicating for non-3GPP access or send a service request without including Allowed PDU session status IE to the AMF entity 200.

In an embodiment, the context matching controller 110 is configured to receive one of the paging message indicating the non-3GPP access or the notification message indicating the non-3GPP access from the 3GPP access network. The context matching controller 110 is configured to detect that the CM state of the non-3GPP access network is in the CM idle state and a connected mode. The UE 100 responds with the service request message including allowed PDU session status IE. The context matching controller 110 is configured to detect that a non-3GPP access network service is available and the non-3GPP access network moves to the connected mode. The context matching controller 110 is configured to perform one of: not trigger a service request message over a non-3GPP access network for a PDU which is allowed to be reactivated in the 3GPP access network prior to a service request procedure for the 3GPP access network is completed or triggering a service request for a PDU which is not allowed to be activated over the 3GPP access network or triggering a service request message for the PDU based on an uplink data which are not allowed to be activated over the 3GPP access network based on an uplink data.

In an embodiment, the context matching controller 110 is configured to receive the paging message indicating the non-3GPP access from the 3GPP access network and detect that the service request message sent with allowed PDU session status IE to the AMF entity 200 is failed. The context matching controller 110 is configured to detect that the CM state of the non-3GPP access network has moved to the connected mode. The UE 100 stops the retry timer and aborts the service request procedure over the 3GPP access network. The context matching controller 110 is configured to send the service request including the uplink data status IE to the AMF entity 200 over the non-3GPP access network. The PDU associated with the non-3GPP access network allowed to be moved to the 3GPP access network is included in the uplink data status IE. The context matching controller 110 is configured to stop the service request for the 3GPP access network.

The communicator 120 is configured for communicating internally between internal hardware components and with external devices via one or more networks. The communicator 120 is configured for communicating with the context matching controller 110 to handle the dual registration and session management in the wireless communication system. In an embodiment, the context matching controller 110 includes a binding controller and a context updater used to handle the dual registration and session management in the wireless communication system.

Further, the processor 140 which is configured to execute instructions stored in a memory 130 and to perform various processes. The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory 130 can be configured to store larger amounts of information than the memory. In certain examples, a non-transitory storage medium may store data that can, over time, change (e.g., in Random Access Memory (RAM) or cache).

Although the FIG. 24 shows various hardware components of the UE 100 but it is to be understood that other embodiments are not limited thereon. In other embodiments, the UE 100 may include less or more number of components. Further, the labels or names of the components are used only for illustrative purpose and does not limit the scope of the invention. One or more components can be combined together to perform same or substantially similar function to handle the dual registration and session management in the wireless communication system.

Figure 25:
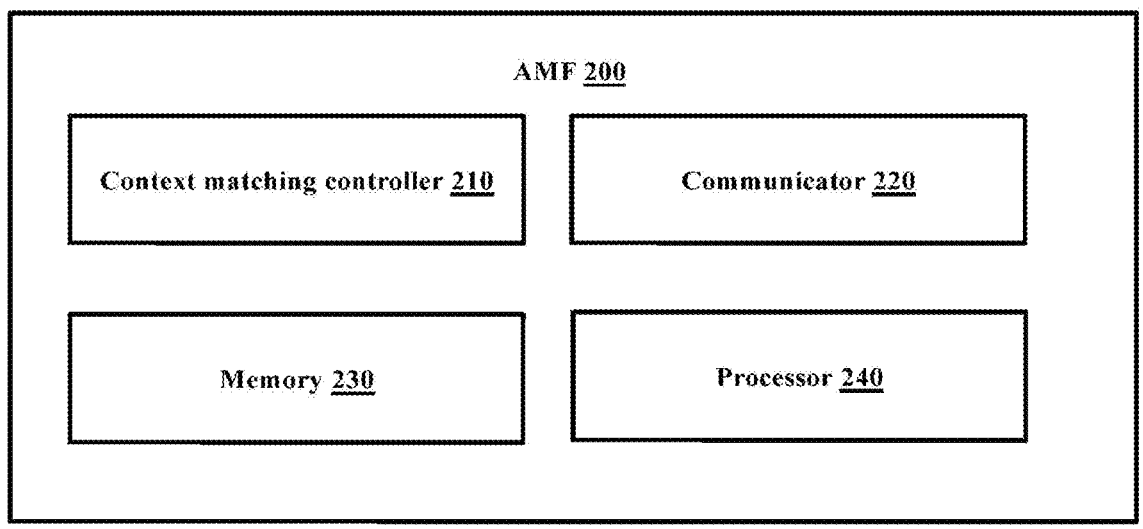
FIG. 25 is a block diagram of the AMF, according to an embodiment of the present invention.
Figure 26:
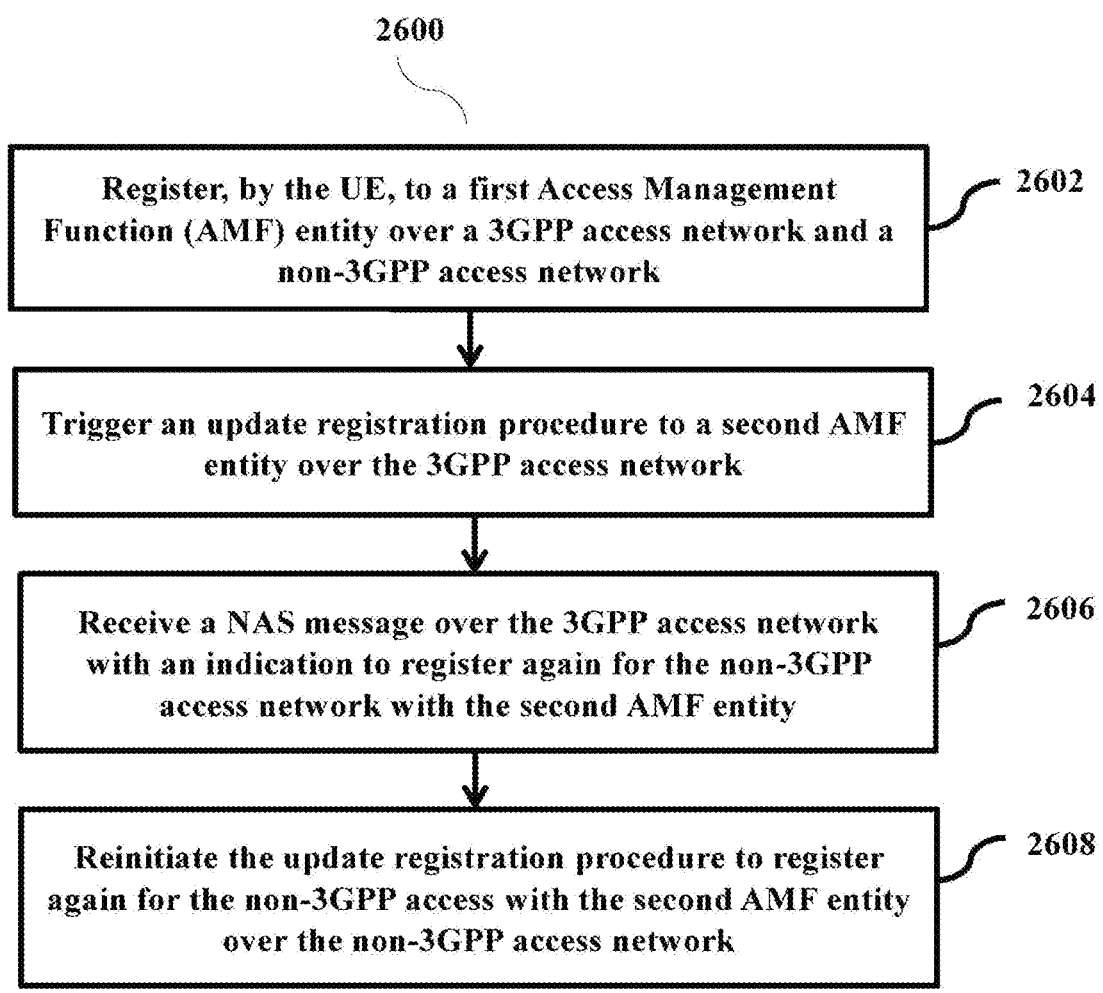
FIG. 26-FIG. 30 are flow diagrams illustrating various steps, implemented by the UE, for handling registration and session management in the wireless communication system, according to an embodiment of the present invention.
Figure 27:
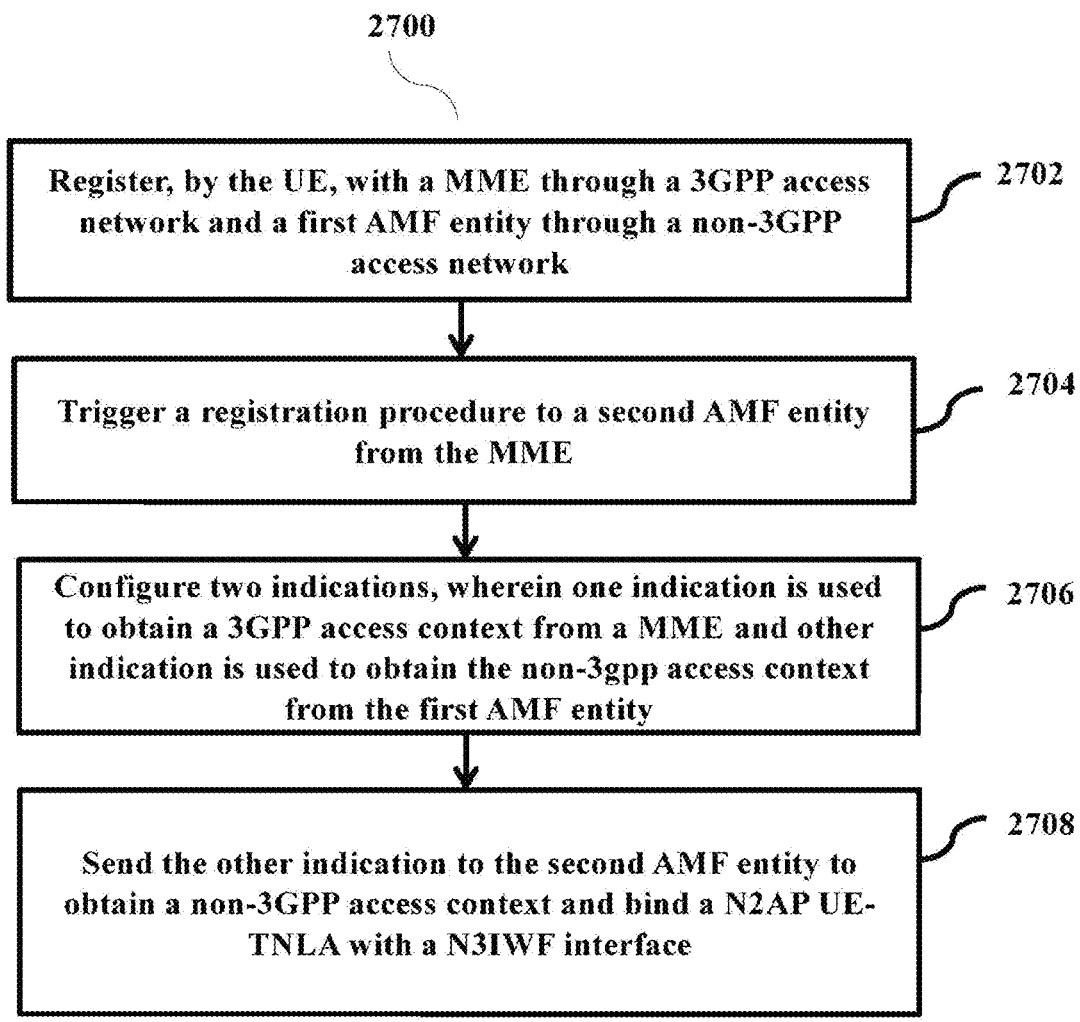
Figure 28:
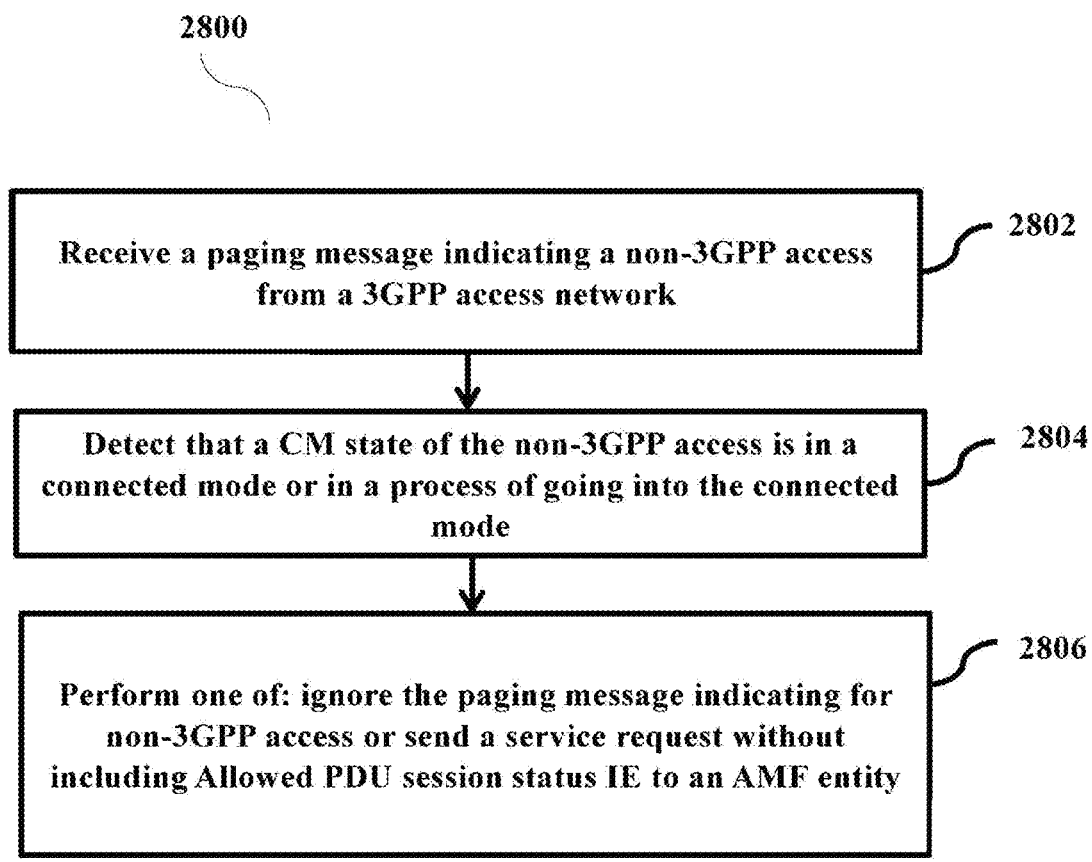
Figure 29:
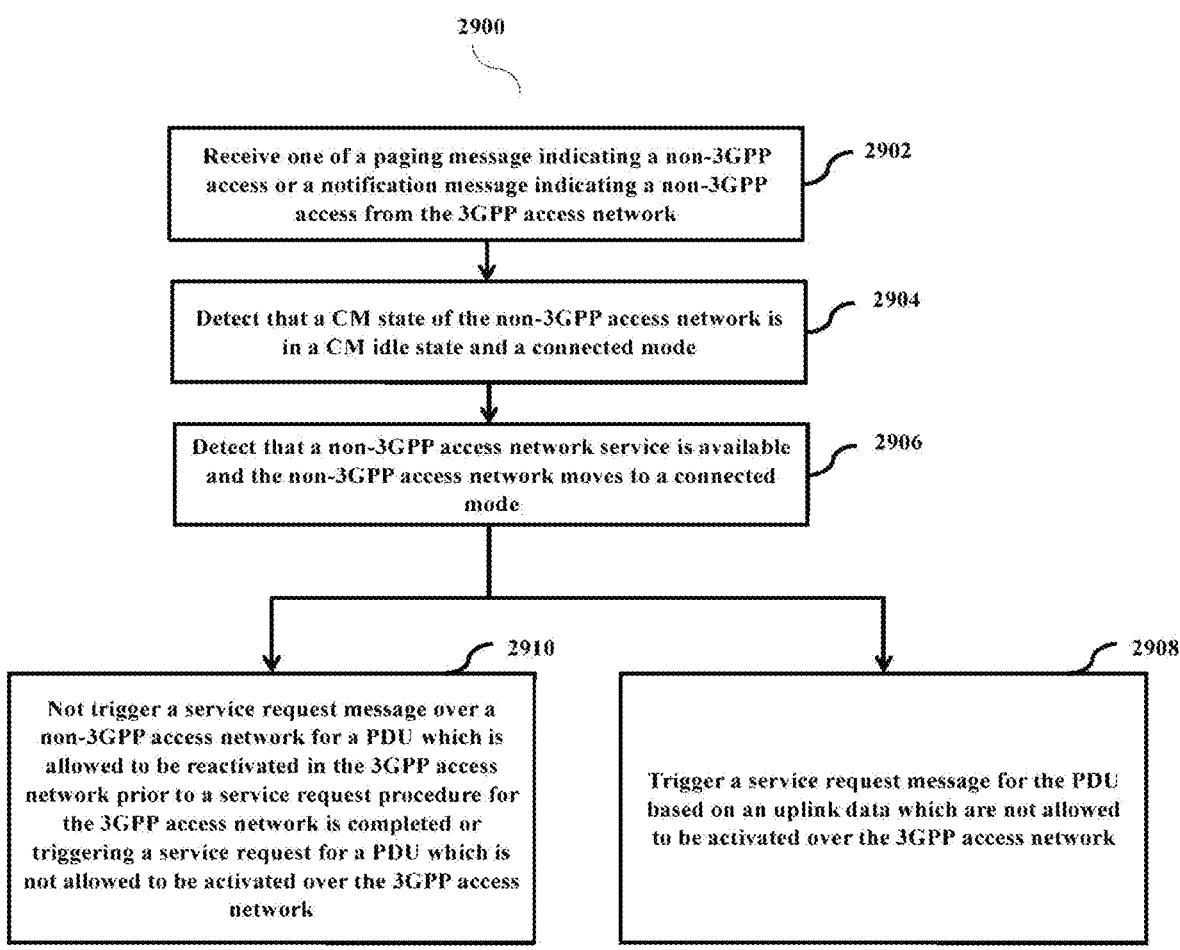
Figure 30:
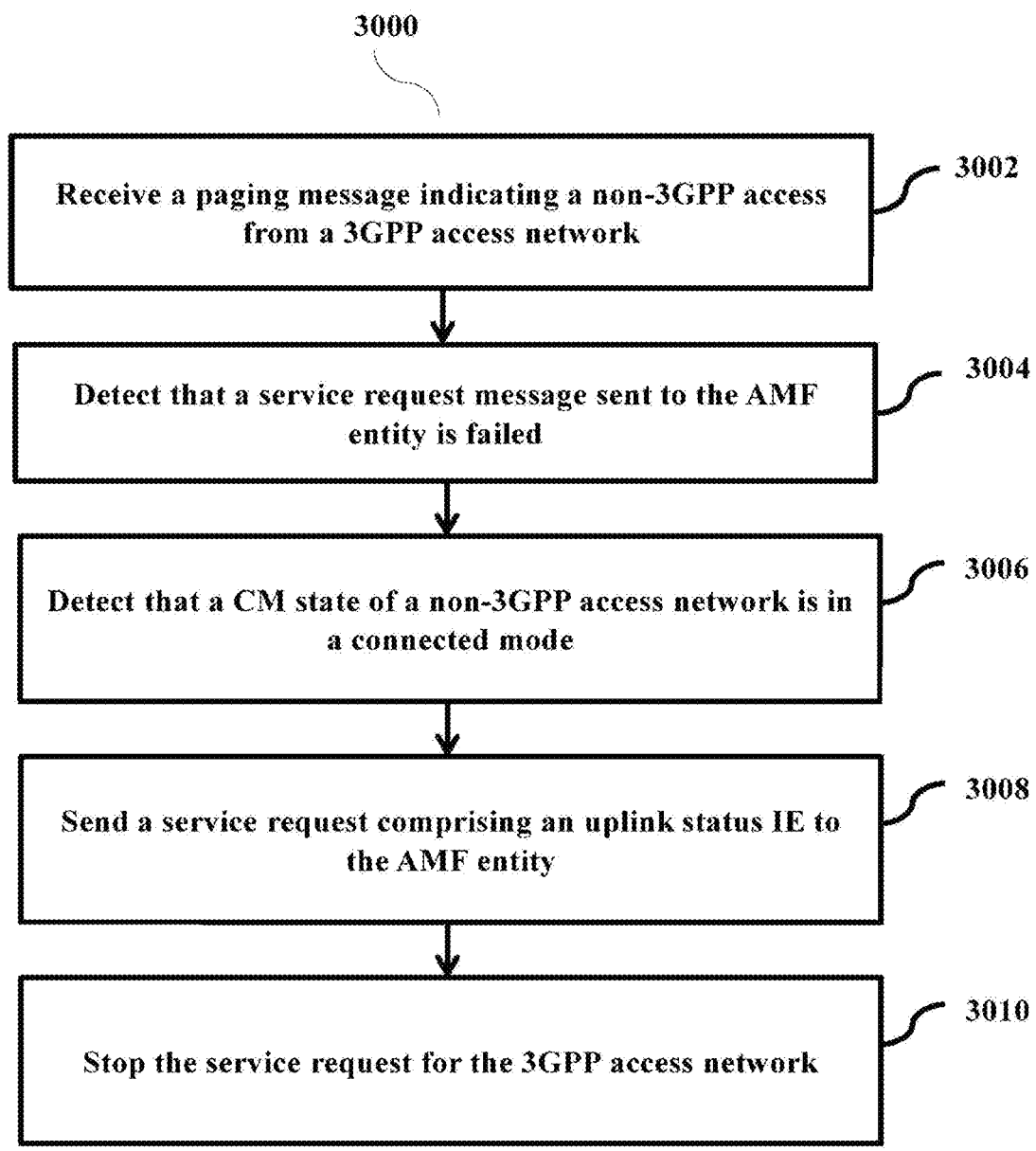
Figure 31:
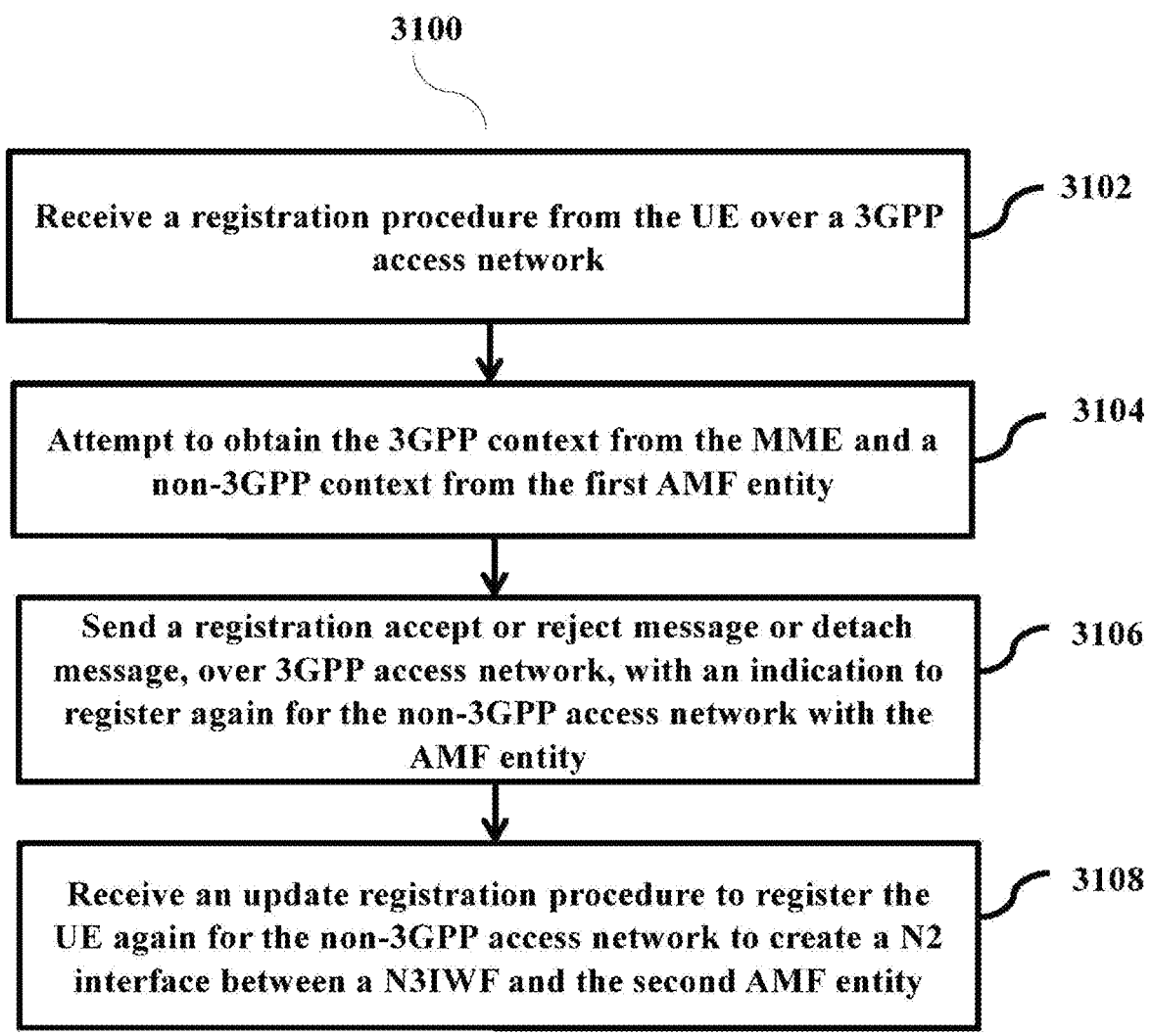
FIG. 31-FIG. 36 are flow diagrams illustrating various steps, implemented by the AMF, for handling registration and session management in the wireless communication system, according to an embodiment of the present invention.
Figure 32:
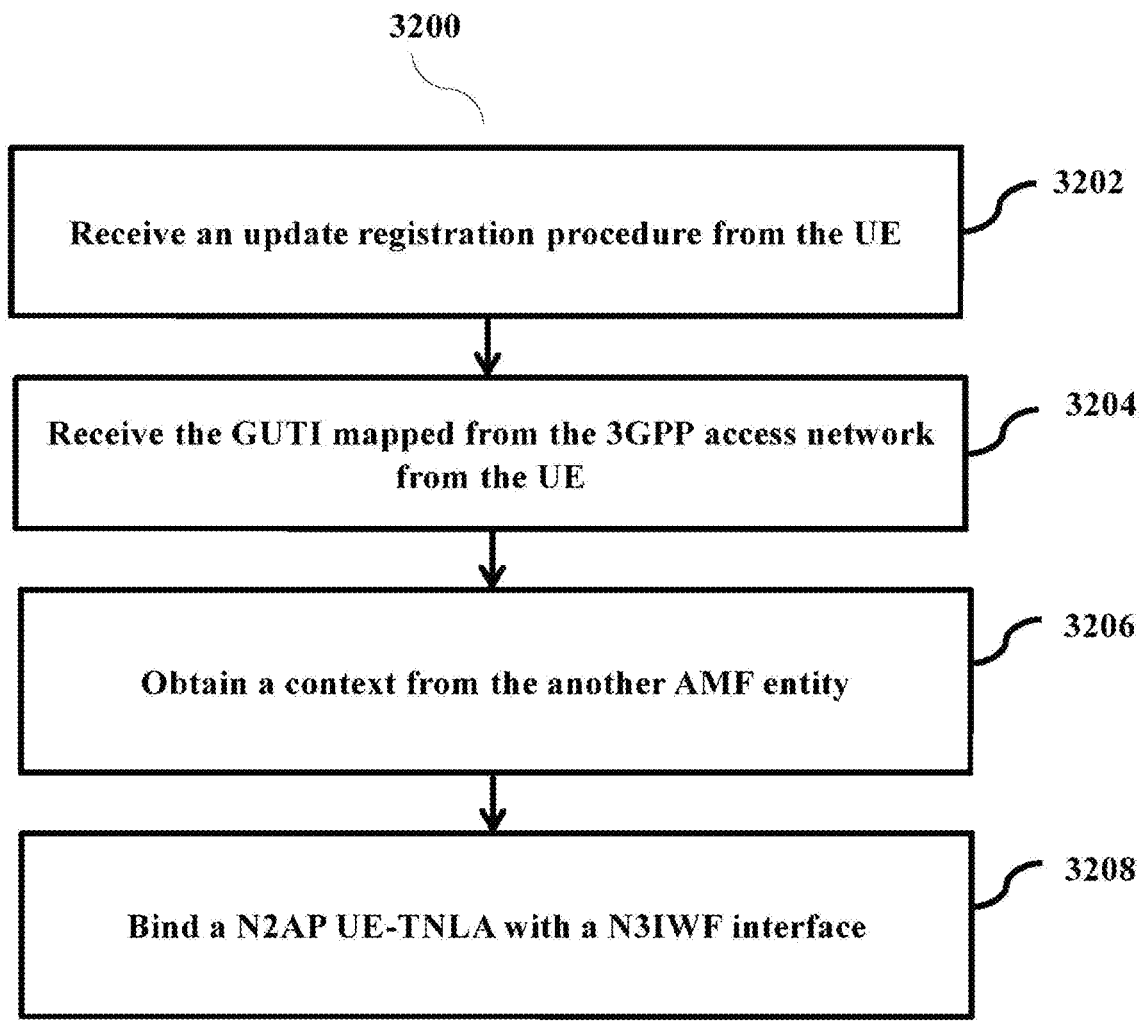
Figure 33:
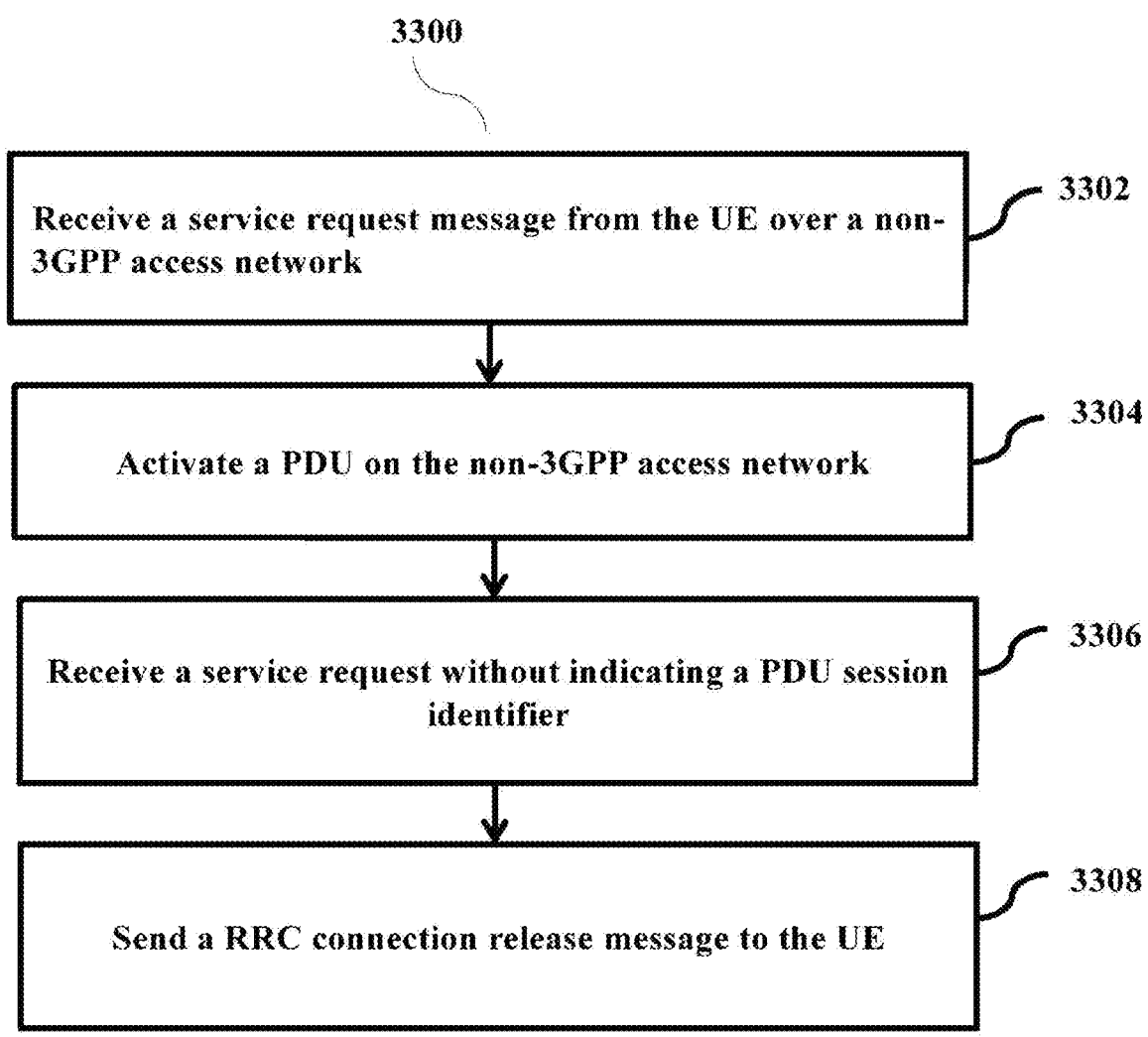
Figure 34:
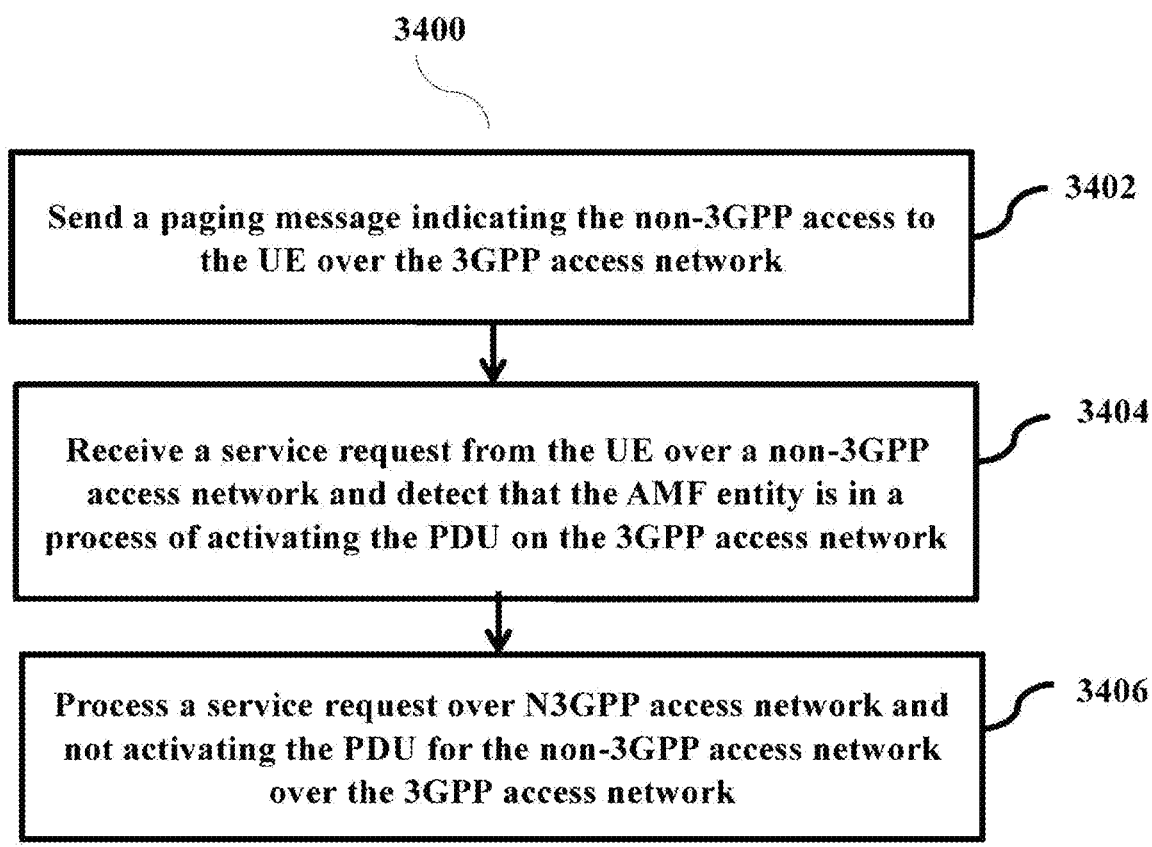
Figure 35:
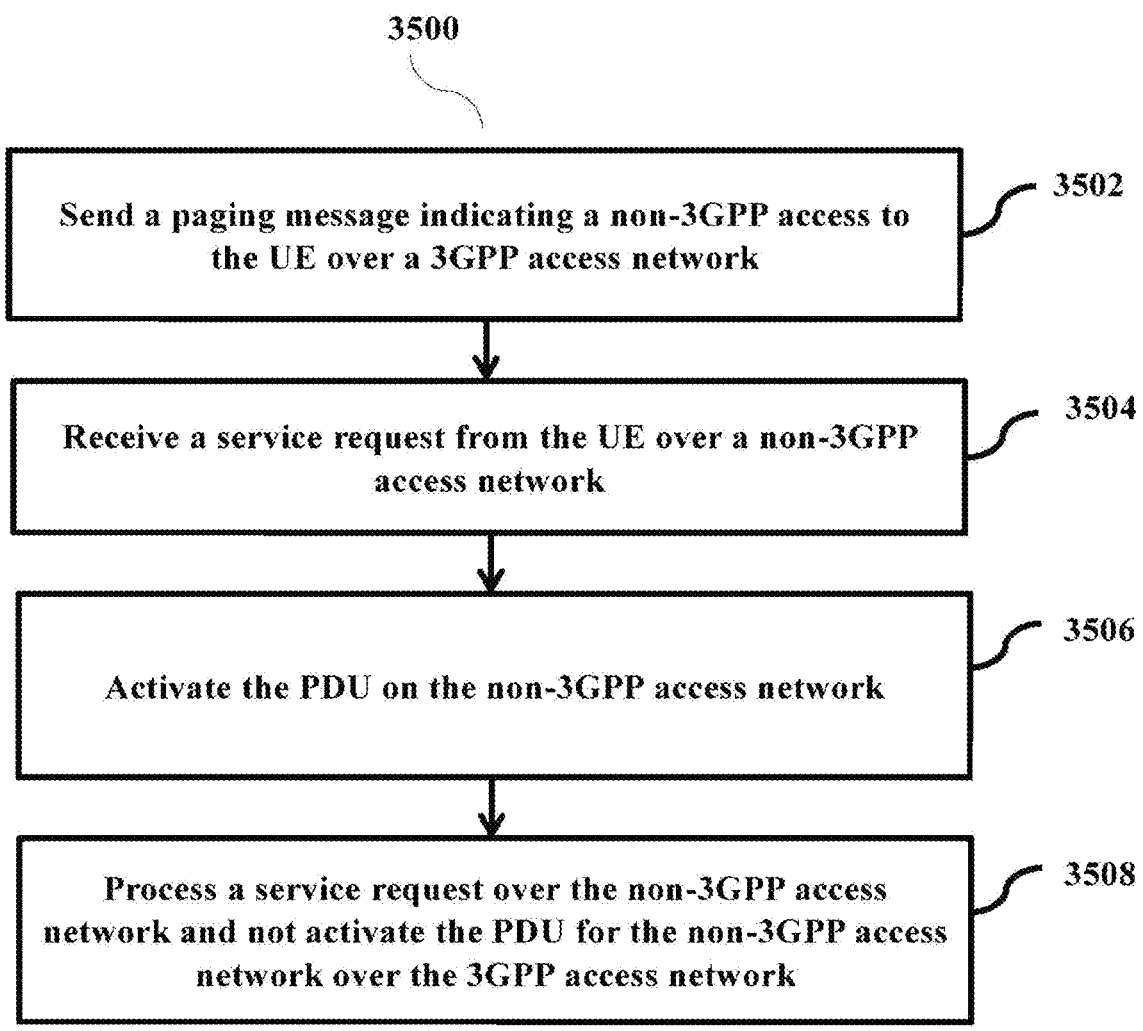
Figure 36:
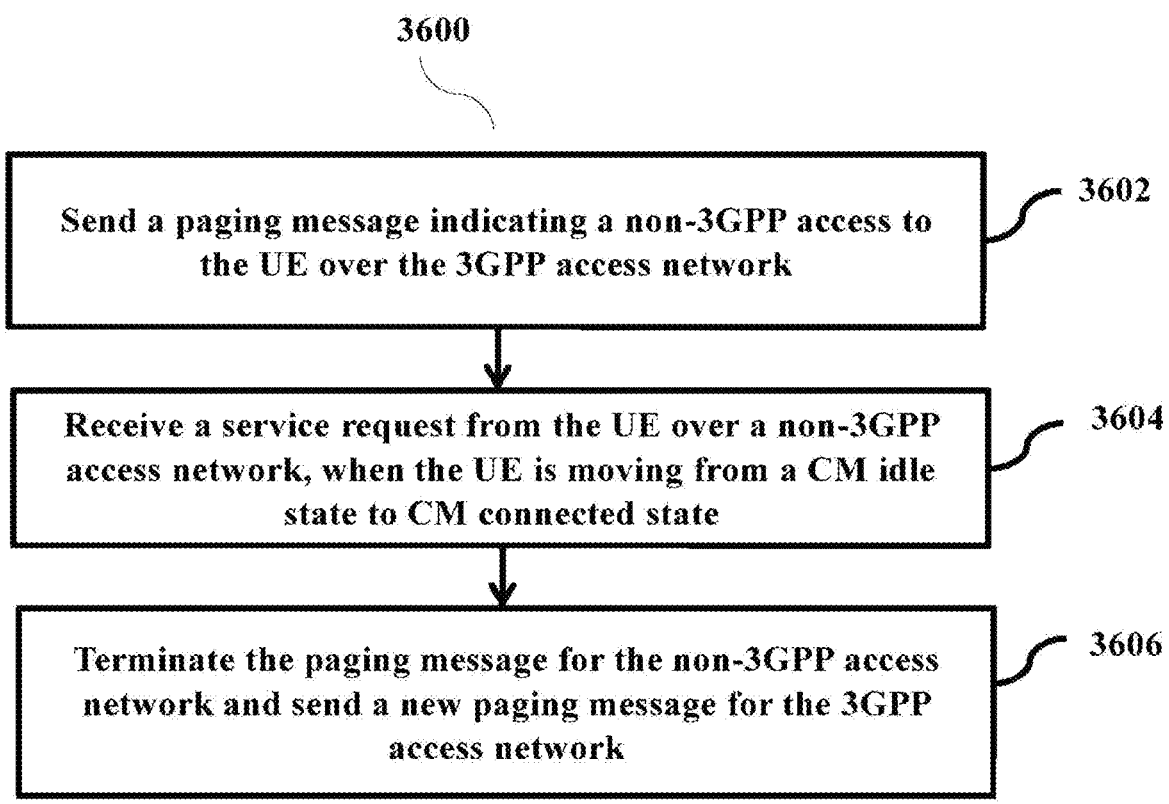

FIG. 25 is a block diagram of the AMF 200, according to an embodiment of the present invention. The AMF 200 includes a context matching controller 210, a communicator 220, a memory 230 and a processor 240. The processor 240 is coupled with the context matching controller 210, the communicator 220, and the memory 230.

In an embodiment, the context matching controller 210 is configured to receive the update registration procedure from the UE 100 over the 3GPP access network. The UE 100 is registered to the 3GPP access network and the non-3GPP access network over another AMF entity 200*b*. Further, the context matching controller 210 is configured to obtain a non-3GPP context from the another AMF entity 200*b* and the 3GPP context from the MME 400. Further, the context matching controller is configured to send the registration accept or reject message with the indication to register again for the non-3GPP access network with the AMF entity 200*a*. Further, the context matching controller 210 is configured to receive the update registration procedure to register the UE 100 again for the non-3GPP access network to create a N2 interface between the N3IWF 300 and the second AMF entity 200*b*.

In an embodiment, the context matching controller 210 is configured to register with the AMF entity 200 for the 3GPP access context and the non-3GPP access context. Further, the context matching controller 210 is configured to detect an intersystem change from the 5G network to the 4G network over a 3GPP access network. Further, the context matching controller 210 configures transfer of the 3GPP access context from the AMF entity 200 to the MME entity 400 and continually maintaining the non-3GPP access context with the AMF 200 through the N3IWF 400.

In an embodiment, the context matching controller 210 is configured to receive an update registration procedure from the UE 100. The UE 100 is with the MME 400 through the 3GPP access network and another AMF entity 200b through the non-3GPP access network. Further, the context matching controller 210 is configured to receive the GUTI mapped from the 3GPP access network from the UE 100. The GUTI includes an indication indicating the AMF entity 200a to obtain the non-3gpp access from the another AMF entity 200b. Further, the context matching controller 210 is configured to obtain the context from the another AMF entity 200b and bind a N2AP UE-TNLA with the N3IWF interface 300.

In an embodiment, the context matching controller 210 is configured to receive the service request message from the UE 100 over the non-3GPP access network. Further, the context matching controller 210 is configured to activate the PDU on the non-3GPP access network and receive the service request without indicating the PDU session identifier. Further, the context matching controller 210 is configured to send the RRC connection release message to the UE 100.

In an embodiment, the context matching controller 210 is configured to send the paging message indicating the non-3GPP access to the UE 100 over the 3GPP access network. The context matching controller 210 is configured to receive the service request from the UE 100 over the non-3GPP access network and detect that the AMF entity 200 is in the process of activating the PDU on the non-3GPP access network. The context matching controller 100 is configured to process the service request and not activating the PDU for the non-3GPP access network over the 3GPP access network, where the PDU is activated over the non-3GPP access network.

In an embodiment, context matching controller 210 is configured to send the paging message indicating a non-3GPP access to the UE 100 over the 3GPP access network. The context matching controller 210 is configured to receive the service request from the UE 100 over the non-3GPP access network and activate the PDU on the 3GPP access network. The context matching controller 210 is configured to process a service request and not activating the PDU for the non-3GPP access network over the 3GPP access network, where the PDU is already activated over the non-3GPP access network.

The communicator 220 is configured for communicating internally between internal hardware components and with external devices via one or more networks. The communicator 220 is configured for communicating with the context matching controller 210 to handle the dual registration in the wireless communication system. In an embodiment, the context matching controller 210 includes a binding controller and a context updater used to handle the dual registration in the wireless communication system Further, the processor 240 which is configured to execute instructions stored in a memory 230 and to perform various processes. The memory 230 also stores instructions to be executed by the processor 240. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory 230 can be configured to store larger amounts of information than the memory. In certain examples, a non-transitory storage medium may store data that can, over time, change (e.g., in Random Access Memory (RAM) or cache).

Although the FIG. 25 shows various hardware components of the AMF 200 but it is to be understood that other embodiments are not limited thereon. In other embodiments, the AMF 200 may include less or more number of components. Further, the labels or names of the components are used only for illustrative purpose and does not limit the scope of the invention. One or more components can be combined together to perform same or substantially similar function to handle the dual registration and session management in the wireless communication system.

FIG. 26-FIG. 30 are flow diagrams 2600-3000 illustrating various steps, implemented by the UE 100, for handling registration and session management in the wireless communication system, according to an embodiment of the present invention.

The operations (2602-2608) are performed by the context matching controller 110. As shown in the FIG. 26, at 2602, the method includes registering, by the UE 100, to the first AMF entity 200a over the 3GPP access network and the non-3GPP access network. At 2604, the method includes triggering the update registration procedure to the second AMF entity 200b over the 3GPP access network, when a periodic timer of the UE expires in an OOS state. At 2606, the method includes receiving the registration accept or reject message with the indication to register again for the non-3GPP access network with the second AMF entity 200b over the 3GPP access network. At 2608, the method includes reinitiating the update registration procedure to register again for the non-3GPP access with the second AMF entity 200b over the non-3GPP access network.

The operations (2702-2708) are performed by the context matching controller 110. As shown in the FIG. 27, at 2702, the method includes registering with the MME 400 through the 3GPP access network and the first AMF entity 200a through the non-3GPP access network. At 2704, the method includes triggering the update registration procedure to the second AMF entity 200b. At 2706, the method includes configuring two indications, wherein one indication is used to obtain the 3GPP access context from the MME 400 and other indication is used to obtain the non-3gpp access context from the first AMF entity 200a. At 2708, the method includes sending the other indication to the second AMF entity 200b to obtain the non-3GPP access context and to bind the N2AP UE-TNLA with the N3IWF interface 300.

The operations (2802-2806) are performed by the context matching controller 110. As shown in the FIG. 28, at 2802, the method includes receiving the paging message indicating the non-3GPP access from the 3GPP access network. At 2804, the method includes detecting that the CM state of the non-3GPP access is in the connected mode or in a process of going into the connected mode. At 2806, the method includes performing one of: ignoring the paging message indicating for non-3GPP access or sending a service request without including Allowed PDU session status IE to the AMF entity 200.

The operations (2902-2908) are performed by the context matching controller 110. As shown in the FIG. 29, at 2902, the method includes receiving one of the paging message indicating the non-3GPP access or the notification message indicating the non-3GPP access from the 3GPP access network. At 2904, the method includes detecting that the CM state of the non-3GPP access network is in the CM idle state and the connected mode. At 2904, the method includes detecting that the non-3GPP access network service is available and the non-3GPP access network moves to the connected mode. At 2910, the method includes not triggering a service request message over a non-3GPP access network for the PDU which is allowed to be reactivated in the 3GPP access network prior to the service request procedure for the 3GPP access network is completed or triggering a service request for a PDU which is not allowed to be activated over the 3GPP access network. At 2908, the method includes triggering the service request message for the PDU based on an uplink data which are not allowed to be activated over the 3GPP access network based on an uplink data.

The operations (3002-3008) are performed by the context matching controller 110. As shown in the FIG. 30, at 3002, the method includes receiving a paging message indicating the non-3GPP access from the 3GPP access network. At 5404, the method includes detecting that the service request message sent to the AMF entity 200 is failed. At 3006, the method includes detecting that the CM state of the non-3GPP access network is in the connected mode. At 3008, the method includes sending the service request comprising the uplink data status IE to the AMF entity 200. The PDU associated with the non-3GPP access network is included in the uplink data status IE. At 3010, the method includes stopping the service request for the 3GPP access network.

FIG. 31-FIG. 36 are flow diagrams 3100-3600 illustrating various steps, implemented by the AMF 200*a*/200*b*, for handling registration and session management in the wireless communication system, according to an embodiment of the present invention.

The operations (3102-3108) are performed by the context matching controller 210. As shown in the FIG. 30, at 3102, the method includes receiving the update registration procedure from the UE 100 over the 3GPP access network. The UE 100 is registered to the 3GPP access network and the non-3GPP access network over another AMF entity 200*b*. At 3104, the method includes attempting to obtain the 3GPP context from the MME 400 and the non-3GPP context from the first AMF entity 200*a*. At 3106, the method includes sending the NAS message (In an example, registration accept or reject message) with the indication to register again for the non-3GPP access network with the AMF entity 200*a*. At 3108, the method includes receiving the update registration procedure to register the UE 100 again for the non-3GPP access network to create the N2 interface between the N3IWF 300 and the AMF entity 200*a*.

The operations (3202-3208) are performed by the context matching controller 210. As shown in the FIG. 32, at 3202, the method includes receiving the update registration procedure from the UE 100. The UE 100 is communicated with the MME 400 through the 3GPP access network and another AMF entity 200*b* through the non-3GPP access network. At 3204, the method includes receiving the GUTI mapped from the 3GPP access network from the UE 100. The GUTI includes an indication indicating the AMF entity 200*a* to obtain the non-3gpp access from the another AMF entity 200*b*. At 3206, the method includes obtaining the context from the another AMF entity 200*b*. At 3208, the method includes binding the N2AP UE-TNLA with a N3IWF interface 300.

The operations (3302-3308) are performed by the context matching controller 210. As shown in the FIG. 33, at 3302, the method includes receiving the service request message from the UE 100 over the non-3GPP access network. At 3304, the method includes activating the PDU on the non-3GPP access network. At 3306, the method includes receiving the service request message without indicating the PDU session identifier. At 3308, the method includes sending the RRC connection release message to the UE.

The operations (3402-3408) are performed by the context matching controller 210. As shown in the FIG. 34, at 3402, the method includes sending the paging message indicating the non-3GPP access to the UE over the 3GPP access network. At 3404, the method includes receiving the service request from the UE over the non-3GPP access network and detecting that the AMF entity is in a process of activating the PDU on the non-3GPP access network. At 3406, the method includes processing the service request over the N3GPP access network and not activating the PDU for the non-3GPP access network over the 3GPP access network. The PDU is activated over the non-3GPP access network.

The operations (3502-3508) are performed by the context matching controller 210. As shown in the FIG. 35, at 3502, the method includes sending the paging message indicating the non-3GPP access to the UE 100 over the 3GPP access network. At 3504, the method includes receiving the service request from the UE over the non-3GPP access network. At 3506, the method includes activating the PDU on the non-3GPP access network. At 3508, the method includes processing the service request over the non-3GPP access network and not activating the PDU for the non-3GPP access network over the 3GPP access network. The PDU is already activated over the non-3GPP access network.

The operations (3602-3606) are performed by the context matching controller 210. As shown in the FIG. 36, at 3602, the method includes sending the paging message indicating the non-3GPP access to the UE 100 over the 3GPP access network. At 3604, the method includes receiving a service request from the UE 100 over the non-3GPP access network, when the UE 100 is moving from the CM idle state to the CM connected state. At 3606, the method includes terminating the paging message for the non-3GPP access network and sending the new paging message for the 3GPP access network.

The various actions, acts, blocks, steps, or the like in the flow diagrams 2600-3600 may be performed in the order presented, in a different order or simultaneously. Further, in some embodiments, some of the actions, acts, blocks, steps, or the like may be omitted, added, modified, skipped, or the like without departing from the scope of the invention.

Figure 37:
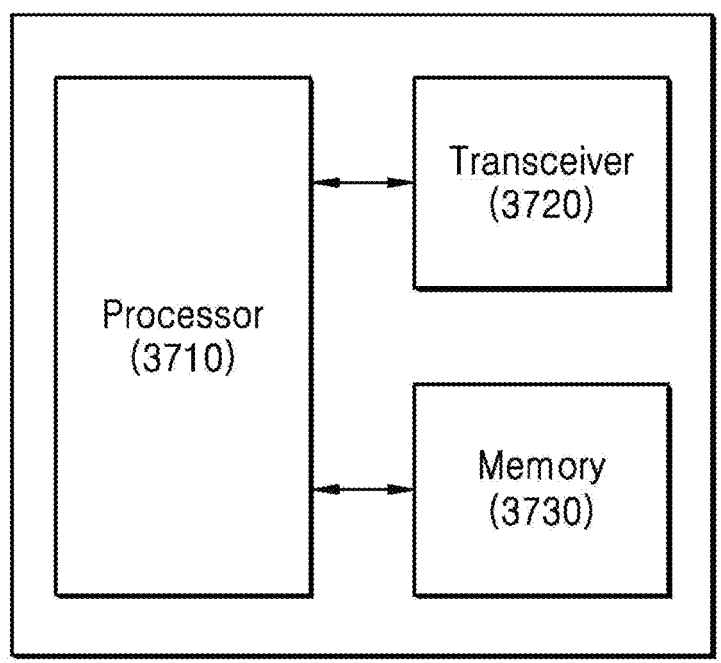
FIG. 37 is a block diagram illustrating an Access Management Function (AMF) entity according to another exemplary embodiment of the present disclosure.

FIG. 37 is a block diagram illustrating an Access Management Function (AMF) entity according to another exemplary embodiment of the present disclosure.

Referring to the FIG. 37, the device 3700 may include a processor 3710, a transceiver 3720 and a memory 3730. However, all of the illustrated components are not essential. The device 3700 may be implemented by more or less components than those illustrated in FIG. 37. In addition, the processor 3710 and the transceiver 3720 and the memory 3730 may be implemented as a single chip according to another embodiment.

The aforementioned components will now be described in detail.

The processor 3710 may include one or more processors or other processing devices that control the proposed function, process, and/or method. The processor may include a context matching controller, coupled to the memory 3730. Operation of the device 3700 may be implemented by the processor 3710.

The processor 3710 may receive a registration procedure from a User Equipment (UE) over a 3rd Generation Partnership Project (3GPP) access network, wherein the UE is registered to the 3GPP access network over a Mobility Management Entity (MME) and a non-3GPP access network over another AMF entity, attempt to obtain a non-3GPP context from the another AMF entity and a 3GPP context from the MME, send a non-access stratum (NAS) message over 3GPP access network with an indication to register again for the non-3GPP access network with the AMF entity, and receive a registration procedure to register the UE for the non-3GPP access network and creating an N2 interface between a N3IWF and the AMF entity.

The transceiver 3720 may include a RF transmitter for up-converting and amplifying a transmitted signal, and a RF receiver for down-converting a frequency of a received signal. However, according to another embodiment, the transceiver 3720 may be implemented by more or less components than those illustrated in components.

The transceiver 3720 may be connected to the processor 3710 and transmit and/or receive a signal. The signal may include control information and data. In addition, the transceiver 3720 may receive the signal through a wireless or wired channel and output the signal to the processor 3710. The transceiver 3720 may transmit a signal output from the processor 3710 through the wireless channel. The transceiver 3720 may communicate with other entities through a wired channel.

The memory 3730 may store the control information or the data included in a signal obtained by the device 3700. The memory 3730 may be connected to the processor 3710 and store at least one instruction or a protocol or a parameter for the proposed function, process, and/or method. The memory 3730 may include read-only memory (ROM) and/or random access memory (RAM) and/or hard disk and/or CD-ROM and/or DVD and/or other storage devices.

Figure 38:
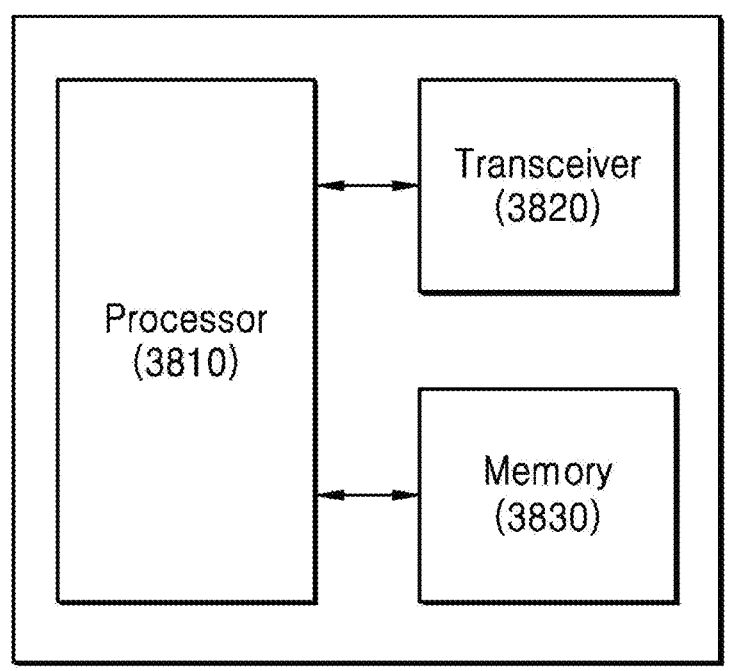
FIG. 38 is a block diagram illustrating a UE according to another exemplary embodiment of the present disclosure.

FIG. 38 is a block diagram illustrating a UE according to another exemplary embodiment of the present disclosure.

Referring to the FIG. 38, the device 3800 may include a processor 3810, a transceiver 3820 and a memory 3830. However, all of the illustrated components are not essential. The device 3800 may be implemented by more or less components than those illustrated in FIG. 38. In addition, the processor 3810 and the transceiver 3820 and the memory 3830 may be implemented as a single chip according to another embodiment.

The aforementioned components will now be described in detail.

The processor 3810 may include one or more processors or other processing devices that control the proposed function, process, and/or method. The processor 3810 may include a context matching controller coupled to the memory 3830. Operation of the device 3800 may be implemented by the processor 3810.

The processor 3810 may register with first core network entity over a 3GPP access network and a non-3$^{rd}$ Generation Partnership Project (3GPP) access network, trigger a registration procedure to a second core network entity over the 3GPP access network, when a periodic timer of the UE expires in an Out-Of-Service (OOS) state, receive a non-access stratum (NAS) over the 3GPP access network with an indication to register for the non-3GPP access network with the second core network entity and reinitiate the registration procedure to register again for the non-3GPP access with the second core network entity through the non-3GPP access network.

The transceiver 3820 may include a RF transmitter for up-converting and amplifying a transmitted signal, and a RF receiver for down-converting a frequency of a received signal. However, according to another embodiment, the transceiver 3820 may be implemented by more or less components than those illustrated in components.

The transceiver 3820 may be connected to the processor 3810 and transmit and/or receive a signal. The signal may include control information and data. In addition, the transceiver 3820 may receive the signal through a wireless channel and output the signal to the processor 3810. The transceiver 3820 may transmit a signal output from the processor 3810 through the wireless channel.

The memory 3830 may store the control information or the data included in a signal obtained by the device 3800. The memory 3830 may be connected to the processor 3810 and store at least one instruction or a protocol or a parameter for the proposed function, process, and/or method. The memory 3830 may include read-only memory (ROM) and/or random access memory (RAM) and/or hard disk and/or CD-ROM and/or DVD and/or other storage devices.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

The UE 100 can be, for example but not limited to, a cellular phone, a tablet, a smart phone, a laptop, a Personal Digital Assistant (PDA), a global positioning system, a multimedia device, a video device, a game console, or the like. The UE 100 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

The UE 100 is compliant with multiple, different communication protocols that can operate as a multi-mode device by communicating within 5G network or a fourth generation (4G) network employing any common type of LTE or LTE-Advanced (LTE-A) radio access technology (RAT), as well as within a third generation (3G) or a second generation (2G) network employing any common type of legacy RAT or a Vo-NR network, and a Vo-WiFi network.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a user equipment (UE) in a wireless communication system, the method comprising:
   receiving, from an access management function (AMF) entity, a paging message associated with a non-3rd Generation Partnership Project (3GPP) access;
   identifying a connection management (CM) state of the non-3GPP access; and
   ignoring the paging message, based on the identified CM state of the non-3GPP access being in a connected mode.

2. The method of claim 1, further comprising:
   transmitting a service request message in response to the paging message, based on the identified CM state of the non-3GPP access being in an idle mode.

3. The method of claim 1, wherein the paging message associated with the non-3GPP access is transmitted by the AMF entity, in case that downlink data is pending to be sent over the non-3GPP access.

4. The method of claim 2, wherein the service request message comprises information regarding a protocol data unit (PDU) session.

5. A user equipment (UE) configured to operate in a wireless communication system, the UE comprising:
   a transceiver; and
   at least one controller coupled with the transceiver and configured to:
      receive, from an access management function (AMF) entity, a paging message associated with a non-3rd Generation Partnership Project (3GPP) access,
      identify a connection management (CM) state of the non-3GPP access, and
      ignore the paging message, based on the identified CM state of the non-3GPP access being in a connected mode.

6. The UE of claim 5, wherein the at least one controller is further configured to:
   transmit a service request message in response to the paging message, based on the identified CM state of the non-3GPP access being in an idle mode.

7. The UE of claim 5, wherein the paging message associated with the non-3GPP access is transmitted by the AMF entity, in case that downlink data is pending to be sent over the non-3GPP access.

8. The UE of claim 6, wherein the service request message comprises information regarding a protocol data unit (PDU) session.

9. The method of claim 1, wherein receiving the paging message includes receiving the paging message over a 3GPP access, and
   wherein the paging message indicates the non-3GPP access.

10. The UE of claim 5, wherein the at least one controller is further configured to receive the paging message over a 3GPP access, and
    wherein the paging message indicates the non-3GPP access.

* * * * *